United States Patent
Feng et al.

(10) Patent No.: US 12,126,734 B2
(45) Date of Patent: Oct. 22, 2024

(54) CROSS-CHAIN DATA TRANSMISSION METHOD AND APPARATUS, COMPUTER DEVICE, STORAGE MEDIUM, AND COMPUTER PROGRAM PRODUCT

(71) Applicant: Tencent Technology (Shenzhen) Company Limited, Shenzhen (CN)

(72) Inventors: Zhibo Feng, Shenzhen (CN); Zixi Shen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 238 days.

(21) Appl. No.: 17/992,808

(22) Filed: Nov. 22, 2022

(65) Prior Publication Data
US 2023/0079672 A1    Mar. 16, 2023

Related U.S. Application Data

(63) Continuation of application No. PCT/CN2022/079644, filed on Mar. 8, 2022.

(30) Foreign Application Priority Data

Mar. 19, 2021   (CN) .......................... 202110293940.4

(51) Int. Cl.
H04L 9/32   (2006.01)
H04L 9/40   (2022.01)
(52) U.S. Cl.
CPC ........ H04L 9/3247 (2013.01); H04L 63/0281 (2013.01)
(58) Field of Classification Search
CPC ..... H04L 9/14–16; H04L 9/3236–3242; H04L 9/3247–3257; H04L 9/50;
(Continued)

(56) References Cited

U.S. PATENT DOCUMENTS

2019/0172026 A1*  6/2019  Vessenes .............. G06Q 20/065
2020/0322175 A1  10/2020  Chen
(Continued)

FOREIGN PATENT DOCUMENTS

CN    109472569 A    3/2019
CN    111262860 A    6/2020
(Continued)

OTHER PUBLICATIONS

Tencent Technology, ISR, PCT/CN2022/079644, Jun. 9, 2022, 2 pgs.
(Continued)

*Primary Examiner* — Kevin Bechtel
(74) *Attorney, Agent, or Firm* — Morgan, Lewis & Bockius LLP

(57) ABSTRACT

A computer device receives a cross-chain request carrying a cross-chain protocol data packet and a first electronic signature that is initiated by a first service application. The cross-chain protocol data packet is encapsulated with cross-chain data, permission information, and a service application public key address. The first electronic signature is obtained by performing a cross-chain signature on the cross-chain protocol data packet based on a service application private key. When the cross-chain signature verification succeeds, the device replaces the service application public key address in the cross-chain protocol data packet with an account public key address to obtain a target cross-chain protocol data packet. The device performs an indirect cross-chain signature on the target cross-chain protocol data packet to obtain a second electronic signature, and generates an updated cross-chain request. The device transmits the updated cross-chain request to a cross-chain node corresponding to a second service application.

20 Claims, 20 Drawing Sheets

(58) Field of Classification Search
CPC ......... H04L 63/0281; H04L 63/12–126; H04L 2209/56
See application file for complete search history.

(56) References Cited

U.S. PATENT DOCUMENTS

| | | | |
|---|---|---|---|
| 2021/0051023 A1* | 2/2021 | Wei | H04L 9/3231 |
| 2021/0272111 A1* | 9/2021 | Wu | G06Q 20/38215 |
| 2021/0344506 A1* | 11/2021 | Wei | G06F 21/6245 |

FOREIGN PATENT DOCUMENTS

| | | | |
|---|---|---|---|
| CN | 112003889 A | 11/2020 | |
| CN | 112200682 A | 1/2021 | |
| CN | 112804354 A | 5/2021 | |

OTHER PUBLICATIONS

Tencent Technology (Shenzhen) Company Limited, WO, PCT/CN2022/079644, Jun. 9, 2022, 5 pgs.
Tencent Technology (Shenzhen) Company Limited, IPRP, PCT/CN2022/079644, Sep. 12, 2023, 6 pgs.

* cited by examiner

FIG. 8

CROSS-CHAIN DATA TRANSMISSION METHOD AND APPARATUS, COMPUTER DEVICE, STORAGE MEDIUM, AND COMPUTER PROGRAM PRODUCT

CROSS-REFERENCE TO RELATED APPLICATIONS

This application is a continuation application of PCT Patent Application No. PCT/CN2022/079644, entitled "CROSS-CHAIN DATA TRANSMISSION METHOD AND APPARATUS, AND COMPUTER DEVICE, STORAGE MEDIUM AND COMPUTER PROGRAM PRODUCT" filed on Mar. 8, 2022, which claims priority to Chinese Patent Application No. 202110293940.4, filed with the State Intellectual Property Office of the People's Republic of China on Mar. 19, 2021, and entitled "CROSS-CHAIN DATA TRANSMISSION METHOD AND APPARATUS, COMPUTER DEVICE, AND STORAGE MEDIUM", all of which are incorporated herein by reference in their entirety.

FIELD OF THE TECHNOLOGY

This application relates to the field of blockchain technologies, and in particular to a cross-chain data transmission method and apparatus, a computer device, a storage medium, and a computer program product.

BACKGROUND OF THE DISCLOSURE

With the development of blockchain technologies, blockchains have been gradually applied to various scenarios. Usually, different organizations use different blockchains to manage their own service data. The same organization can also use different service applications to manage different service data by using different blockchains.

Different blockchains are often developed with different technical architectures. Consequently, data exchange between different organizations (or even within the same organization) often cannot be directly performed. As a bridge between different blockchains, a cross-chain technology can realize data interoperability between different blockchains. However, what the existing cross-chain technology can achieve is only the data interoperability between blockchains, and cannot provide a secure and efficient data interoperability solution between a service application and a blockchain and between a blockchain and a blockchain from a service level.

SUMMARY

According to various embodiments of this application, a cross-chain data transmission method and apparatus, a computer device, a storage medium, and a computer program product are provided.

In accordance with some embodiments of the present disclosure, a cross-chain data transmission method is provided, and is performed by a cross-chain node. The method includes:

receiving a cross-chain request that is initiated by a first service application, the cross-chain request carrying a cross-chain protocol data packet and a first electronic signature, the cross-chain protocol data packet being encapsulated with cross-chain data, permission information, and a service application public key address, and the first electronic signature being obtained by performing a cross-chain signature on the cross-chain protocol data packet based on a service application private key;

performing cross-chain signature verification on the cross-chain protocol data packet according to the first electronic signature;

in accordance with a determination that the cross-chain signature verification succeeds, replacing the service application public key address in the cross-chain protocol data packet with an account public key address, to obtain a target cross-chain protocol data packet, the account public key address being an address corresponding to an account public key stored on a governance chain for cross-chain management and control;

performing an indirect cross-chain signature on the target cross-chain protocol data packet based on an account private key matching the account public key to obtain a second electronic signature, and generating an updated cross-chain request carrying the second electronic signature and the target cross-chain protocol data packet; and transmitting the updated cross-chain request to a cross-chain node corresponding to a second service application.

In accordance with some embodiments of the present disclosure, a cross-chain data transmission apparatus is provided. The apparatus includes:

a request receiving module, configured to receive a cross-chain request carrying a cross-chain protocol data packet and a first electronic signature that is initiated by a first service application, the cross-chain protocol data packet being encapsulated with cross-chain data, permission information, and a service application public key address, and the first electronic signature being obtained by performing a cross-chain signature on the cross-chain protocol data packet based on a service application private key;

a signature verification module, configured to perform cross-chain signature verification on the cross-chain protocol data packet according to the first electronic signature;

a data packet update module, configured to replace, when the cross-chain signature verification passes, the service application public key address in the cross-chain protocol data packet with an account public key address, to obtain a target cross-chain protocol data packet, the account public key address being an address corresponding to an account public key stored on a governance chain for cross-chain management and control;

a request update module, configured to perform an indirect cross-chain signature on the target cross-chain protocol data packet based on an account private key matching the account public key to obtain a second electronic signature, and generate an updated cross-chain request carrying the second electronic signature and the target cross-chain protocol data packet; and a request transmission module, configured to transmit the updated cross-chain request to a cross-chain node corresponding to a second service application.

In accordance with some embodiments of the present disclosure, a computer device is provided. The computer device includes memory and one or more processors. The memory stores a computer program. The processor, when executing the computer program, implements the following steps:

receiving a cross-chain request carrying a cross-chain protocol data packet and a first electronic signature that is initiated by a first service application, the cross-chain protocol data packet being encapsulated with cross-chain data, permission information, and a service application public key address, and the first electronic signature being obtained by performing a cross-chain signature on the cross-chain protocol data packet based on a service application private key;

performing cross-chain signature verification on the cross-chain protocol data packet according to the first electronic signature;

replacing, when the cross-chain signature verification passes, the service application public key address in the cross-chain protocol data packet with an account public key address, to obtain a target cross-chain protocol data packet, the account public key address being an address corresponding to an account public key stored on a governance chain for cross-chain management and control;

performing an indirect cross-chain signature on the target cross-chain protocol data packet based on an account private key matching the account public key to obtain a second electronic signature, and generating an updated cross-chain request carrying the second electronic signature and the target cross-chain protocol data packet; and transmitting the updated cross-chain request to a cross-chain node corresponding to a second service application.

In accordance with some embodiments of the present disclosure, a non-transitory computer-readable storage medium is provided. The computer-readable storage medium stores a computer program. The computer program, when executed by a processor, implements the following steps:

receiving a cross-chain request carrying a cross-chain protocol data packet and a first electronic signature that is initiated by a first service application, the cross-chain protocol data packet being encapsulated with cross-chain data, permission information, and a service application public key address, and the first electronic signature being obtained by performing a cross-chain signature on the cross-chain protocol data packet based on a service application private key;

performing cross-chain signature verification on the cross-chain protocol data packet according to the first electronic signature;

replacing, when the cross-chain signature verification passes, the service application public key address in the cross-chain protocol data packet with an account public key address, to obtain a target cross-chain protocol data packet, the account public key address being an address corresponding to an account public key stored on a governance chain for cross-chain management and control;

performing an indirect cross-chain signature on the target cross-chain protocol data packet based on an account private key matching the account public key to obtain a second electronic signature, and generating an updated cross-chain request carrying the second electronic signature and the target cross-chain protocol data packet; and transmitting the updated cross-chain request to a cross-chain node corresponding to a second service application.

In accordance with some embodiments of the present disclosure, a computer program is provided. The computer program includes computer instructions that are stored in a computer-readable storage medium. A processor of a computer device reads the compute instructions from the computer-readable storage medium, and executes the computer instructions, to cause the computer device to perform the following steps:

receiving a cross-chain request carrying a cross-chain protocol data packet and a first electronic signature that is initiated by a first service application, the cross-chain protocol data packet being encapsulated with cross-chain data, permission information, and a service application public key address, and the first electronic signature being obtained by performing a cross-chain signature on the cross-chain protocol data packet based on a service application private key;

performing cross-chain signature verification on the cross-chain protocol data packet according to the first electronic signature;

replacing, when the cross-chain signature verification passes, the service application public key address in the cross-chain protocol data packet with an account public key address, to obtain a target cross-chain protocol data packet, the account public key address being an address corresponding to an account public key stored on a governance chain for cross-chain management and control;

performing an indirect cross-chain signature on the target cross-chain protocol data packet based on an account private key matching the account public key to obtain a second electronic signature, and generating an updated cross-chain request carrying the second electronic signature and the target cross-chain protocol data packet; and transmitting the updated cross-chain request to a cross-chain node corresponding to a second service application.

Details of one or more embodiments of this application are provided in the accompany drawings and descriptions below. Other features and advantages of this application become obvious with reference to the specification, the accompanying drawings, and the claims.

BRIEF DESCRIPTION OF THE DRAWINGS

The accompanying drawings described herein are used for providing a further understanding of this application, and form part of this application. Exemplary embodiments of this application and descriptions thereof are used for explaining this application, and do not constitute any inappropriate limitation to this application. In the accompanying drawings:

FIG. 8 is a schematic diagram of a channel establishment request initiation page according to an embodiment.

DESCRIPTION OF EMBODIMENTS

To make objectives, technical solutions, and advantages of this application clearer and more understandable, this application is further described in detail below with reference to the accompanying drawings and the embodiments. It is to be understood that the specific embodiments described herein are only used for explaining this application, and are not used for limiting this application.

In the claims, the specification, and the accompanying drawings of this application, the terms "first", "second", "third", and the like (if existing) are intended to distinguish between similar objects rather than describe a specific sequence or a precedence order. It may be understood that the data termed in such a way are interchangeable in proper circumstances, so that the embodiments of this application described herein can be implemented in other orders than the order illustrated or described herein.

Figure 1A:
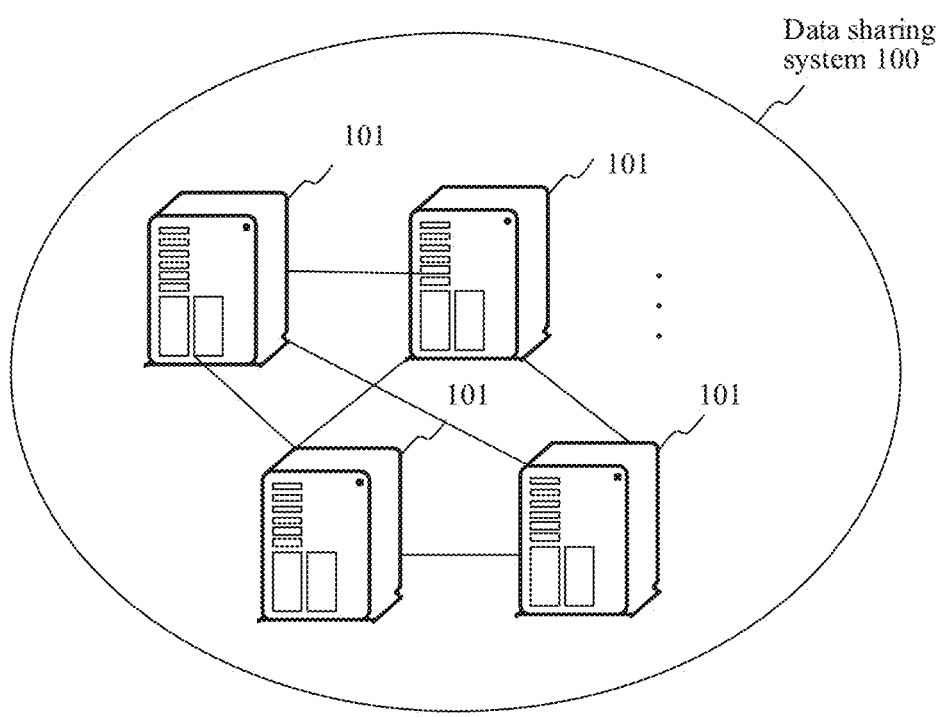
FIG. 1A is a data sharing system according to an embodiment.

Referring to a data sharing system shown in FIG. 1A, the data sharing system 100 is a system for data sharing between nodes. The data sharing system may include a plurality of nodes 101. In some embodiments, the plurality of nodes 101 may be clients in the data sharing system. Each node 101 may receive input information during normal operation, and maintain shared data in the data sharing system based on the received information. To ensure information interoperability in the data sharing system, there may be an information connection between any two nodes in the data sharing system. Information transmission may be performed between the nodes through the above information connection. For example, when any node in the data sharing system receives input information, other nodes in the data sharing system obtain the input information according to a consensus algorithm, and store the input information as data in shared data, so that data stored on all nodes in the data sharing system is consistent.

Each node in the data sharing system has a node identifier corresponding to the node. Each node in the data sharing system may store a node identifier of another node in the data sharing system, to broadcast a generated block to the another node in the data sharing system according to the node identifier of the another node subsequently. Each node may maintain a node identifier list shown in the following table, and node names and node identifiers are correspondingly stored in the node identifier list. The node identifier may be an internet protocol (IP) address and any other type of information that can be used to identify the node. Table 1 only uses the IP address as an example for description.

TABLE 1

| Node name | Node identifier |
| --- | --- |
| Node 1 | 117.114.151.174 |
| Node 2 | 117.116.189.145 |
| ... | ... |
| Node N | 119.123.789.258 |

Figure 1B:
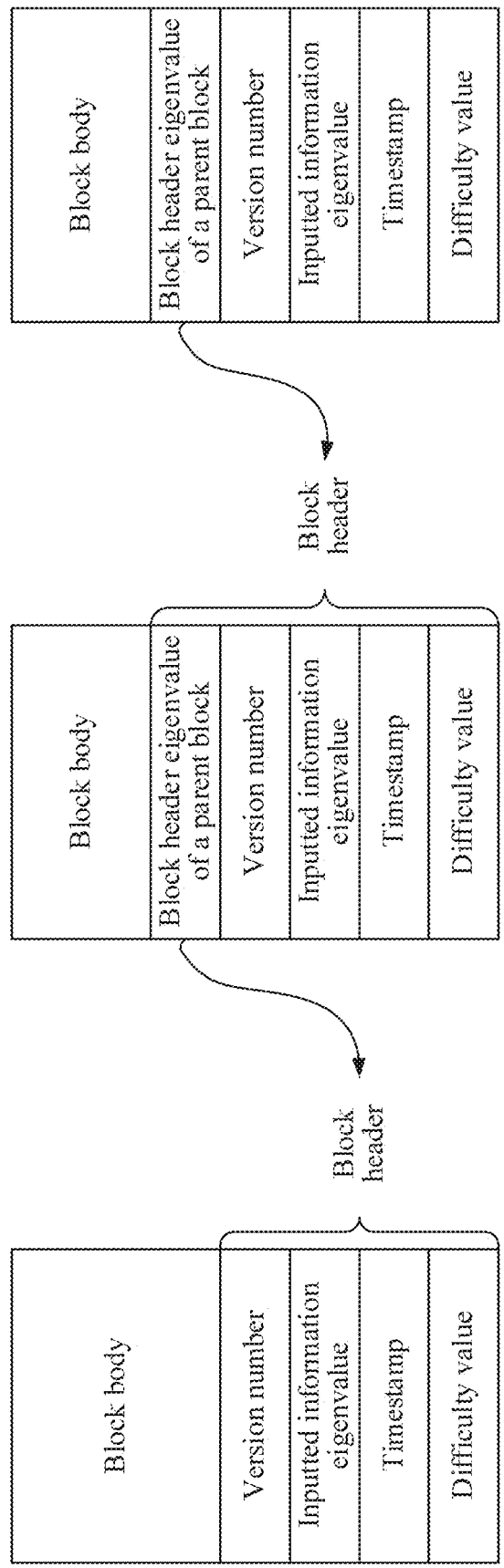
FIG. 1B is a structural diagram of a blockchain according to an embodiment.

In some embodiments, a blockchain is stored in each node in the data sharing system. In some embodiments, every node in the data sharing system stores an identical blockchain. Referring to FIG. 1B, the blockchain includes a plurality of blocks, and a genesis block includes a block header and a block body. The block header stores an eigenvalue (e.g., feature value) of input information, a version number, a timestamp, and a difficulty value, and the block body stores the input information. A next block of the genesis block uses the genesis block as a parent block, and the next block also includes a block header and a block body. The block header stores an eigenvalue of input information of the current block, the eigenvalue in the block header of the parent block, a version number, a timestamp, and a difficulty value, and the rest is deduced by analogy, so that block data stored in each block in the blockchain is associated with block data stored in the parent block, thereby ensuring the security of the input information in the blocks.

Figure 1C:
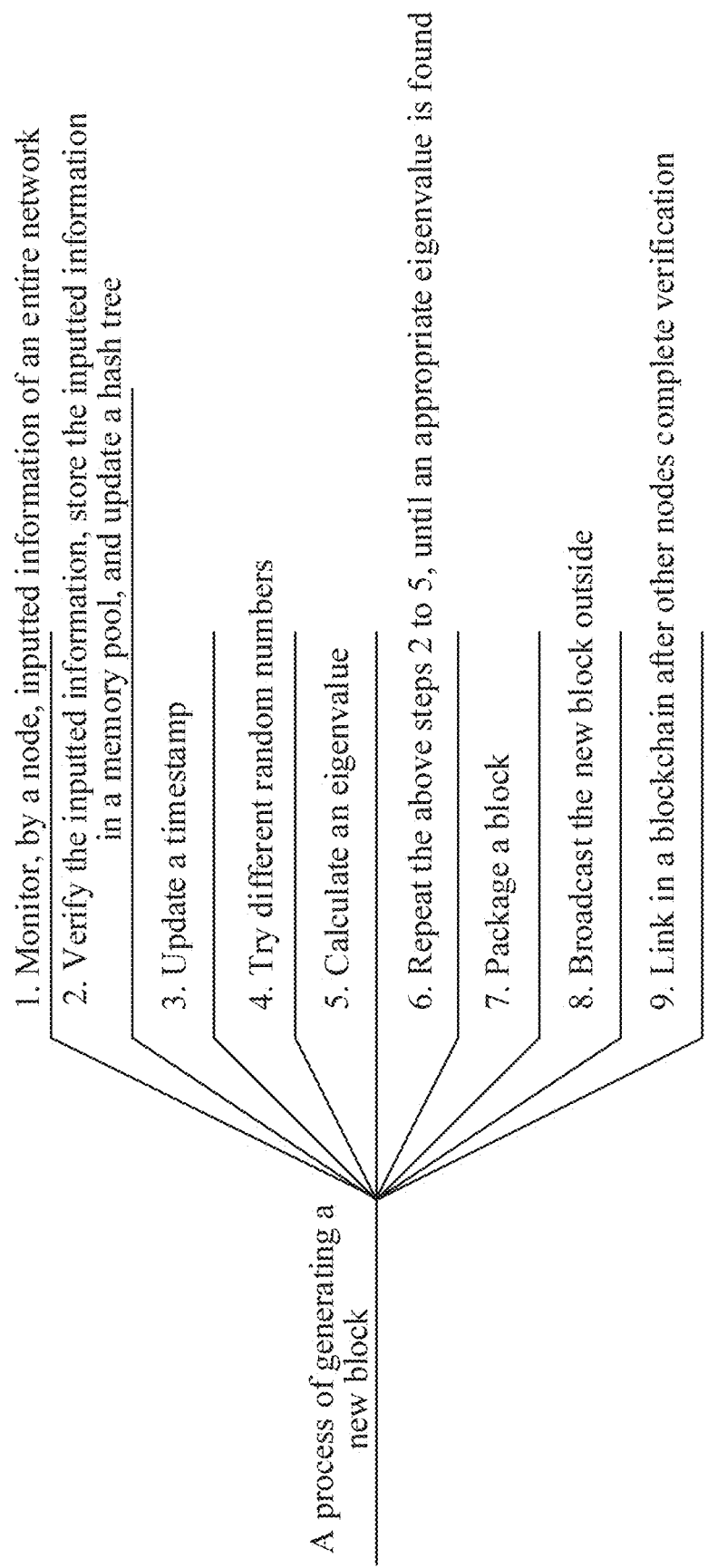
FIG. 1C is a schematic diagram of a process of generating a new block according to an embodiment.

When blocks are generated in the blockchain, referring to FIG. 1C, when a node in which the blockchain is located receives the inputted information, the input information is verified. After the verification is completed, the inputted information is stored in a memory pool, and a hash tree thereof used for recording the input information is updated. Next, the timestamp is updated to the time when the input information is received, different random numbers are tried, and eigenvalue calculation is performed a plurality of times, so that the calculated eigenvalue may satisfy the following formula:

$$SHA256(SHA256(version+prev\_hash+merkle\_root+ntime+nbits+x))<TARGET$$

where, SHA256 is an eigenvalue algorithm used for calculating an eigenvalue; version (a version number) is version information of a related block protocol in the blockchain; prev_hash is the block header eigenvalue of the parent block of the current block; merkle_root is the input information eigenvalue; ntime is the update time of updating the timestamp; nbits is current difficulty, is a fixed value within a period of time, and is redetermined after the fixed period of time; x is a random number; and TARGET is an eigenvalue threshold, and the eigenvalue threshold may be determined and obtained according to nbits.

In this way, when a random number satisfying the above formula is obtained through calculation, information may be correspondingly stored, and a block header and a block body are generated, to obtain the current block. Subsequently, the node in which the blockchain is located sends, according to node identifiers of other nodes in the data sharing system, a newly generated block to the other nodes in the data sharing system in which the node is located, the newly generated block is verified by the other nodes, and after the verification is completed, the newly generated block is added to the blockchain stored in the nodes.

Figure 2:
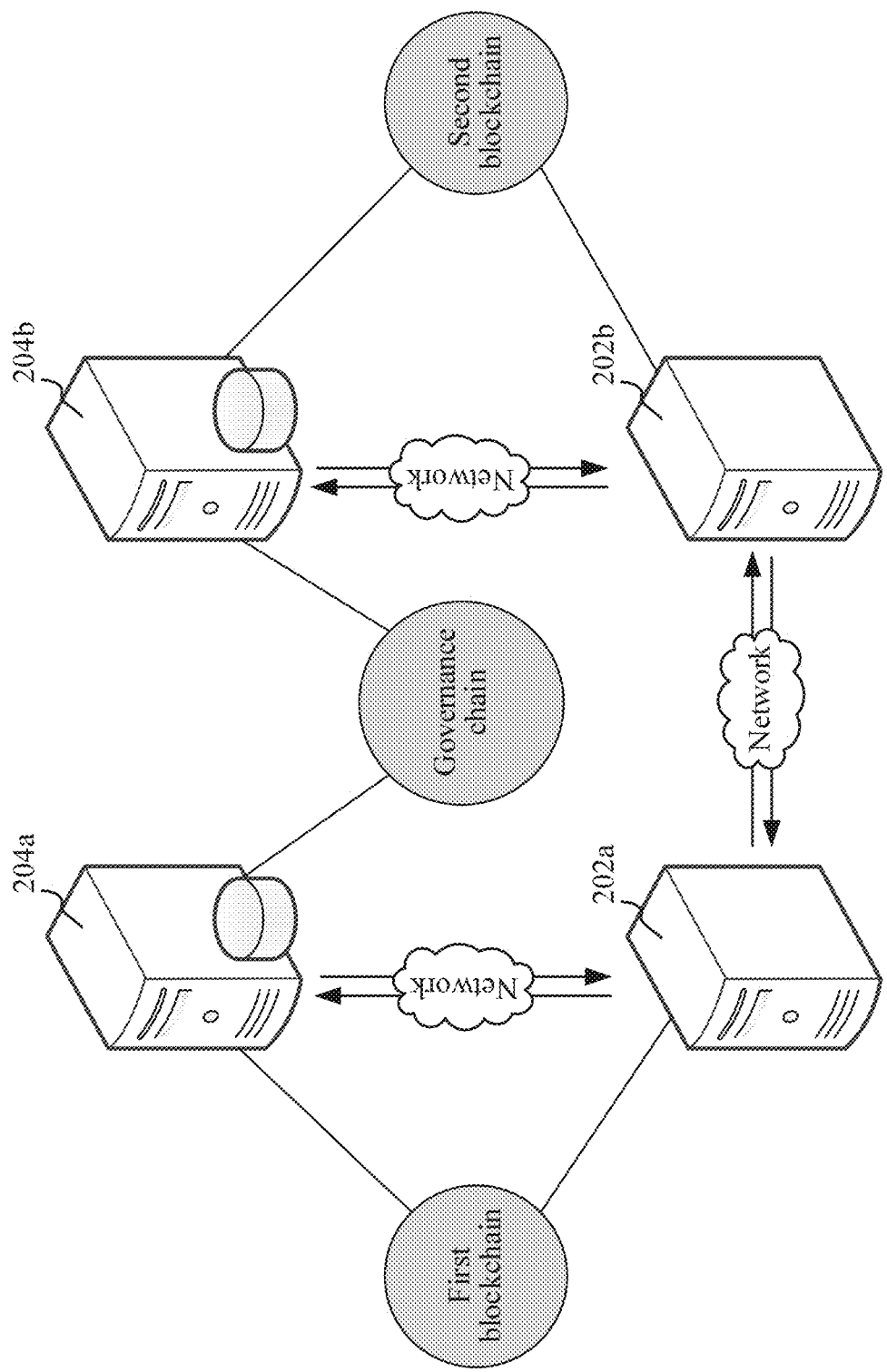
FIG. 2 is a diagram of an application environment of a cross-chain data transmission method according to an embodiment.

A cross-chain data transmission method provided in this application is performed by a cross-chain node, and may be specifically applied to an application environment shown in FIG. 2. The application environment includes a first service blockchain, a second service blockchain, a governance chain, a cross-chain node 202a corresponding to a first service application, a cross-chain node 202b corresponding to a second service application, a first governance node 204a, and a second governance node 204b. The first service blockchain is a service blockchain of the first service application, and the second service blockchain is a service blockchain of the second service application. The cross-chain node 202a corresponding to the first service application is a node belonging to the first service blockchain, and the cross-chain node 202b corresponding to the second service application is a node belonging to the second service blockchain. The governance chain is a blockchain jointly maintained by different organizations with cross-chain interoperability requirements. Each organization includes at least one service application, and each organization respectively corresponds to one governance node. Through the governance node, each organization can register corresponding service application information thereof on the governance chain, so as to use the governance chain to manage and control cross-chain data transmission between a service application and a service blockchain, and cross-chain data transmission between a service blockchain and a service blockchain. The first governance node 204a is a governance node corresponding to the first service application. The second governance node 204b is a governance node corresponding to the second service application. By using an example in which the cross-chain data transmission method is performed by the cross-chain node 202a corresponding to the first service application for description, the cross-chain node corresponding to the first service application receives a cross-chain request carrying a cross-chain protocol data packet and a first electronic signature that is initiated by the first service application. The cross-chain protocol data packet is encapsulated with cross-chain data, permission information, and a service application public key address. The first electronic signature is obtained by performing a cross-chain signature on the cross-chain protocol data packet based on a service application private key. The cross-chain node performs cross-chain signature verification on the cross-chain protocol data packet according to the first electronic signature. The cross-chain node replaces, when the cross-chain signature verification passes, the service application public key address in the cross-chain protocol data packet with an account public key address, to obtain a target cross-chain protocol data packet. The account public key address is an address corresponding to an account public key stored on a governance chain for cross-chain management and control; performs an indirect cross-chain signature on the target cross-chain protocol data packet based on an account private key matching the account public key to obtain a second electronic signature, and generating an updated cross-chain request carrying the second electronic signature and the target cross-chain protocol data packet; and transmits the updated cross-chain request to the cross-chain node corresponding to the second service application.

The cross-chain node 202a corresponding to the first service application, the cross-chain node 202b corresponding to the second service application, the first governance node 204a, and the second governance node 204b may each be a node cluster or a node, and any node may be formed by a server or a terminal. The server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be an intelligent terminal such as a smart phone, a tablet computer, a notebook computer, a desktop computer, and an intelligent television. In addition, the cross-chain node 202a and the first governance node 204a corresponding to the first service application may also be deployed on a same computer device (a terminal or a server), and the cross-chain node 202b and the second governance node 204b corresponding to the second service application may also deployed on same two computer devices (terminals or servers). That is to say, the cross-chain node 202a and the first governance node 204a corresponding to the first service application may be a same node, and the cross-chain node 202b and the second governance node 204b corresponding to the second service application may be a same node.

Figure 3:
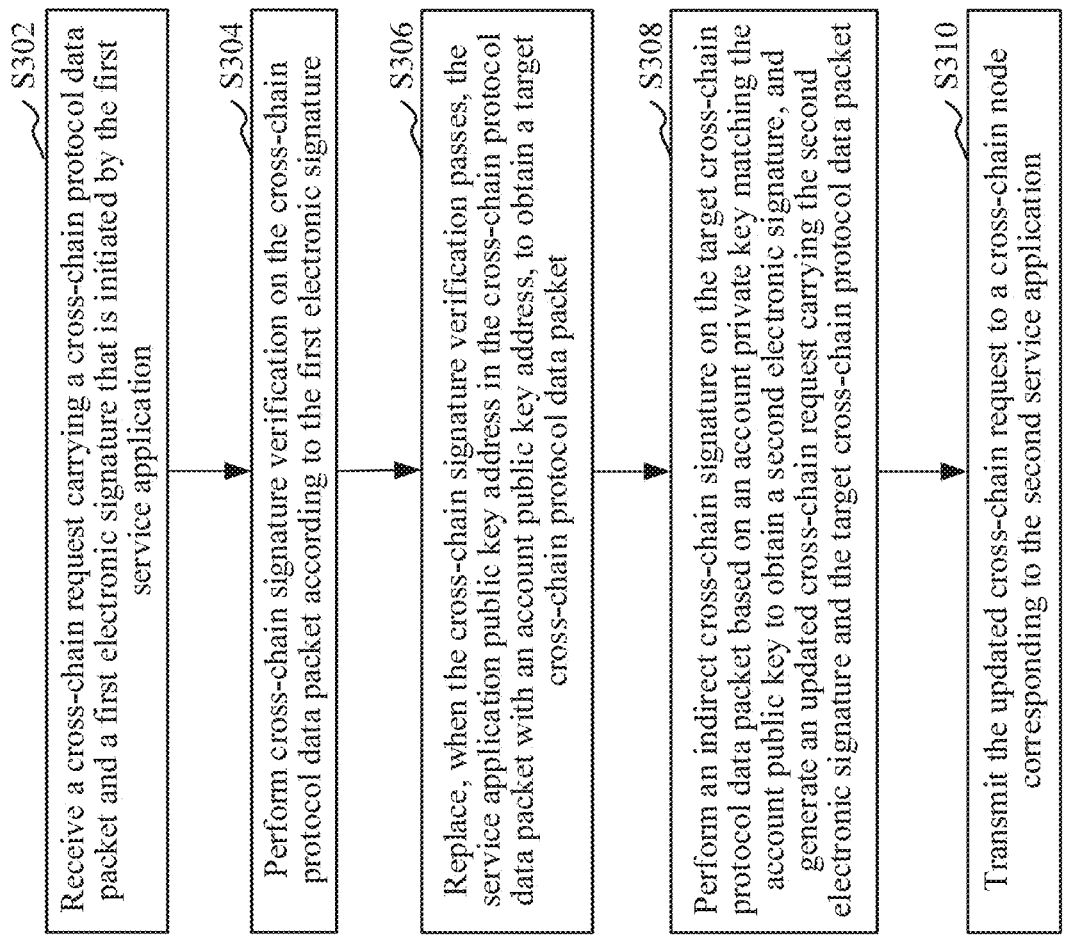
FIG. 3 is a schematic flowchart of a cross-chain data transmission method according to an embodiment.

In an embodiment, as shown in FIG. 3, a cross-chain data transmission method is provided. By using an example in which the method is applied to the cross-chain node 202a corresponding to the first service application in FIG. 2 for description, the method includes the following steps.

S302. Receive a cross-chain request carrying a cross-chain protocol data packet and a first electronic signature that is initiated by the first service application.

The first service application is a sub-application in an application system of a cross-chain initiator. For example, the application system of the cross-chain initiator is an information management system of an enterprise. If the information management system of the enterprise includes a production management sub-application, a financial accounting sub-application, a material supply sub-application, a sales management sub-application, a labor salary sub-application, and a personnel management sub-application, and the like, which respectively have functions such as production management, financial accounting, material supply, product sales, salary and personnel, and the like, the first service application may be any sub-application of the production management sub-application, the financial accounting sub-application, the material supply sub-application, the sales management sub-application, the labor salary sub-application, or the personnel management sub-application. It may be understood that service data corresponding to different sub-applications is stored in different service blockchains. For example, production data corresponding to the production management sub-application is stored in a service blockchain A, and financial data corresponding to the financial accounting sub-application is stored in a service blockchain B, material data corresponding to the material supply sub-application is stored in a service blockchain C, and the like.

The cross-chain request is used for requesting to perform a data operation on a service blockchain of a second service application. For example, the data operation may be a data download operation or a data up-to-chain operation. The data download operation specifically refers to reading target data from the service blockchain of the second service application, and the data up-to-chain operation specifically refers to uploading a new block to the service blockchain of the second service application. The second service application refers to a sub-application of an application system of a cross-chain receiver. The second service application may be an application that has a service association with the first service application. The application system of the cross-chain receiver and the application system of the cross-chain initiator may be a same application system, and the application system of the cross-chain receiver and the application system of the cross-chain initiator may also be different application systems. When the application system of the cross-chain receiver and the application system of the cross-chain initiator are the same application system, the second service application and the first service application belong to the same application system. When the application system of the cross-chain receiver and the application system of the cross-chain initiator are different application systems, the second service application and the first service application belong to different application systems. For example, if the first service application is a procurement sub-application of an information management system of an enterprise A, the second service application is a sales sub-system of an information management system of an enterprise B, and the enterprise B is a supplier of the enterprise A, the procurement sub-application of the enterprise A may request to perform a data operation on a blockchain of the sales sub-system of the enterprise B, and the performed data operation may be a query operation. The query operation is also the data download operation, such as querying information of a commodity sold by the enterprise B on the blockchain of the sales sub-system of the enterprise B. In another example, the first service application is a financial accounting sub-application of the enterprise A and the second service application is a financial accounting sub-application of the enterprise B. After the enterprise A purchases and receives goods from the enterprise B, funds of enterprise A are electronically transferred to a blockchain of the financial accounting sub-application of the enterprise B through the financial accounting sub-application of the enterprise A. The performed data operation is a resource transfer operation, and the resource transfer operation is also the data up-to-chain operation.

A data packet carried in the cross-chain request includes the cross-chain protocol data packet and the first electronic signature, where the cross-chain protocol data packet is obtained by encapsulating cross-chain data, permission information, and a service application public key address, and the first electronic signature is obtained by performing a cross-chain signature on the cross-chain protocol data packet based on a service application private key.

The cross-chain data is the data required to perform a data operation on the blockchain of the second service application, that is, condition data when executing a corresponding smart contract. A smart contract is a computerized protocol that may be used for executing terms of a contract, and is implemented by using code that is deployed in the shared ledger and that is executed when a condition is satisfied. The code is used for completing an automated transaction according to an actual service requirement. The smart contract can also execute a contract for processing received information in addition to executing a contract for transactions.

The permission information may be information used for verifying whether the first service application has a cross-chain operation permission. The permission information belongs to channel constraint information, and the channel constraint information is attribute information of a cross-chain channel to be used in a current data transmission process, and is encapsulated in the cross-chain protocol data packet. The cross-chain channel is a communication channel that is pre-built to transmit the cross-chain data and realize a cross-chain data operation between cross-chain service application parties. The channel constraint information belongs to at least one part of channel registration information registered on a governance chain when the cross-chain channel is established. The channel constraint information includes account information and service application information, and the service application information includes at least one of an application name, service routing information, or smart contract information. The account information includes an account identifier registered by a cross-chain initiator on the governance chain and an account identifier registered by a cross-chain receiver on the governance chain. The application name includes an application name of a service application of the cross-chain initiator and an application name of a service application of the cross-chain receiver. The service routing information includes address information of a blockchain node corresponding to the service application of the cross-chain initiator and address information of a blockchain node corresponding to the service application of the cross-chain receiver. The smart contract information includes smart contract information corresponding to the service application of the cross-chain initiator and smart contract information corresponding to the service application of the cross-chain receiver.

The service application public key address is an address corresponding to a service application public key stored on the governance chain for cross-chain management and control. The service application public key may be obtained from the governance chain based on the service application public key address. The service application public key address may be encapsulated in the cross-chain protocol data packet as a part of a transaction certificate. The transaction certificate is a certificate of a cross-chain operation transaction requested by this cross-chain request. In some embodiments, the transaction certificate includes four parts: a transaction ID of this transaction, a transaction timestamp, a random character string, and a public key address. When the cross-chain signature is performed on the cross-chain protocol data packet by using the service application private key, the public key address in the transaction certificate is the service application public key address.

Figure 4:
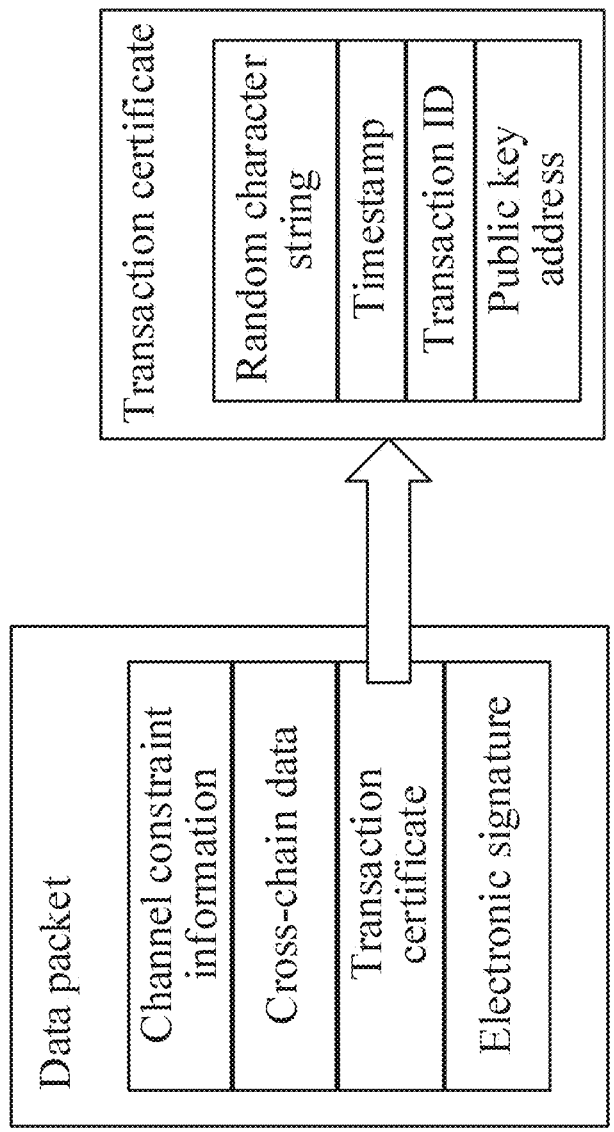
FIG. 4 is a schematic structural diagram of a data packet for cross-chain data transmission according to an embodiment.

It may be understood that, a structure of the data packet carried in the cross-chain request in this embodiment of this application is shown in FIG. 4, and includes four parts: the cross-chain data, the channel constraint information, the transaction certificate, and the electronic signature, where the channel constraint information includes the permission information, the transaction certificate includes the public key address, and a private key used for the electronic signature matches a public key corresponding to the public key address in the transaction certificate. That is, when the transaction certificate is the service application public key address, the electronic signature is the first electronic signature obtained by performing the cross-chain signature on the cross-chain protocol data packet based on the service application private key.

Specifically, a computer device obtains the cross-chain data, the permission information, and the transaction certificate in response to a cross-chain operation triggered by a user through the first service application; invokes an interface of the corresponding cross-chain channel based on the permission information; encapsulates the cross-chain data, the permission information, and the transaction certificate based on the a cross-chain protocol to obtain the cross-chain protocol data packet; performs the cross-chain signature on the cross-chain protocol data packet by using the service application private key to obtain the first electronic signature; generates the cross-chain request carrying the cross-chain protocol data packet and the first electronic signature; and transmits the cross-chain request to the cross-chain node corresponding to the first service application through the invoked cross-chain channel. The cross-chain node corresponding to the first service application receives the cross-chain request.

In an embodiment, the computer device obtains the cross-chain data, the channel constraint information, and the transaction certificate in response to a cross-chain operation triggered by a user through the first service application by the following steps: the user may input cross-chain parameters through the first service application, and trigger a cross-chain operation; and the computer device obtains the inputted cross-chain parameters in response to the cross-chain operation, obtains the cross-chain data based on data parameters in the cross-chain parameters, obtains the channel constraint information based on channel parameters in the cross-chain parameters, obtains an application public key address of the first service application, and generates the transaction certificate based on the application public key address.

In an embodiment, the computer device obtains the cross-chain data based on data parameters in the cross-chain parameters by: directly determining the data parameters in the cross-chain parameters as the cross-chain data; or determining a target block on a service blockchain of the first service application based on the data parameters in the cross-chain parameters, obtaining target data from the target block, and using the target data as the cross-chain data.

In an embodiment, after the cross-chain protocol data packet is obtained, the computer device obtains a service application private key of the first service application, directly encrypts the cross-chain protocol data packet based on the service application private key to obtain an encryption result, and determines the encryption result as the first electronic signature.

In an embodiment, after the cross-chain protocol data packet is obtained, the computer device performs an operation on the cross-chain protocol data packet by using a preset operation function to obtain a Hash value, encrypts the obtained Hash value by using the service application private key to obtain an encryption result, and determines the encryption result as the first electronic signature. The preset operation function may be a one-way hash function.

S304. Perform cross-chain signature verification on the cross-chain protocol data packet according to the first electronic signature.

The cross-chain signature verification performed on the cross-chain protocol data packet includes identity verification and data completeness verification.

Specifically, after the cross-chain request carrying the cross-chain protocol data packet and the first electronic signature that is initiated by the first service application is received, the cross-chain node corresponding to the first service application obtains a service application public key of the first service application based on the cross-chain request, and performs cross-chain signature verification on the cross-chain protocol data packet based on the service application public key of the first service application and the first electronic signature.

In an embodiment, S304 includes the following steps: obtaining a service application public key corresponding to the service application public key address; performing cross-chain decryption processing on the first electronic signature according to the service application public key, to obtain a decryption result; and performing cross-chain comparison between the decryption result and the cross-chain protocol data packet, to obtain a verification result of the cross-chain protocol data packet.

In this embodiment of this application, before the first service application initiates the cross-chain request, the cross-chain initiator performs cross-chain account registration on the governance chain to obtain the registered account information, registers service application information of the first service application that needs to perform the cross-chain operation on the governance chain after the registration is successful, and stores the service application public key of the first service application on the governance chain.

Specifically, after the cross-chain node corresponding to the first service application receives the cross-chain request carrying the cross-chain protocol data packet and the first electronic signature that is initiated by the first service application, the cross-chain node corresponding to the first service application obtains the service application public key of the first service application from the governance chain based on the service application public key address in the cross-chain protocol data packet. The cross-chain node decrypts the first electronic signature according to the obtained service application public key, to obtain the decryption result. The cross-chain node performs cross-chain comparison between the decryption result and the cross-chain protocol data packet, to obtain the verification result of the cross-chain protocol data packet.

In an embodiment, if the decryption result is a decrypted cross-chain protocol data packet, cross-chain comparison is performed between the decrypted cross-chain protocol data packet and the cross-chain protocol data packet. When the decrypted cross-chain protocol data packet is the same as the cross-chain protocol data packet, it may be determined that the cross-chain signature verification of the cross-chain protocol data packet passes. When the decrypted cross-chain protocol data packet is different from the cross-chain protocol data packet, it may be determined that the cross-chain signature verification of the cross-chain protocol data packet fails.

In an embodiment, if the decryption result is a decrypted Hash value, the cross-chain node corresponding to the first service application performs an operation on the cross-chain protocol data packet by using a preset operation function to obtain a Hash value, and performs cross-chain comparison between the decrypted Hash value and the calculated Hash value. When the decrypted Hash value is the same as the calculated Hash value, it may be determined that the cross-chain signature verification of the cross-chain protocol data packet passes (e.g., succeeds). When the decrypted Hash value is different from the calculated Hash value, it may be determined that the cross-chain signature verification of the cross-chain protocol data packet fails.

S306. Replace, when the cross-chain signature verification passes, the service application public key address in the cross-chain protocol data packet with an account public key address, to obtain a target cross-chain protocol data packet.

The account public key address is an address corresponding to an account public key stored on the governance chain for cross-chain management and control, and an account public key of an account registered by the cross-chain initiator on the governance chain may be obtained from the governance chain based on the account public key address.

In this embodiment of this application, before the first service application initiates the cross-chain request, the cross-chain initiator performs cross-chain account registration on the governance chain to obtain the registered account information, and stores the account public key of the cross-chain initiator on the governance chain.

Specifically, when the cross-chain node corresponding to the first service application performs cross-chain signature verification on the cross-chain protocol data packet and the verification passes, the cross-chain node corresponding to the first service application obtains the account public key address corresponding to the cross-chain initiator, and replaces the service application public key address in the received cross-chain protocol data packet with the account public key address, to obtain the target cross-chain protocol data packet.

In an embodiment, after the cross-chain signature verification is performed on the cross-chain protocol data packet and the verification passes, the cross-chain node corresponding to the first service application performs decapsulation processing on the cross-chain protocol data packet, to obtain the cross-chain data, the channel constraint information, and the transaction certificate. The cross-chain node replaces the service application public key address in the transaction certificate with the account public key address, to obtain an updated transaction certificate. The cross-chain node re-encapsulates the cross-chain data, the channel constraint information, and the updated transaction certificate, to obtain the target cross-chain protocol data packet.

S308. Perform an indirect cross-chain signature on the target cross-chain protocol data packet based on an account private key matching the account public key to obtain a second electronic signature, and generate an updated cross-chain request carrying the second electronic signature and the target cross-chain protocol data packet.

Specifically, after the service application public key address in the cross-chain protocol data packet is replaced with the account public key address to obtain the target cross-chain protocol data packet, the cross-chain node corresponding to the first service application obtains the account private key corresponding to the cross-chain initiator, performs the indirect cross-chain signature on the target cross-chain protocol data packet based on the account private key to obtain the second electronic signature; and uses the second electronic signature and the target cross-chain protocol data packet as an updated data packet to generate the updated cross-chain request, where the updated cross-chain request carries the updated data packet. The obtained account private key matches the account public key stored on the governance chain.

In an embodiment, after the target cross-chain protocol data packet is obtained, the cross-chain node corresponding to the first service application obtains the account private key corresponding to the cross-chain initiator, directly encrypts the target cross-chain protocol data packet based on the account private key to obtain an encryption result, and determines the encryption result as the second electronic signature.

In an embodiment, after the target cross-chain protocol data packet is obtained, the cross-chain node corresponding to the first service application performs an operation on the target cross-chain protocol data packet by using a preset operation function to obtain a target Hash value, encrypts the obtained target Hash value by using the account private key corresponding to the cross-chain initiator to obtain an encryption result, and determines the encryption result as the second electronic signature. The preset operation function may be a one-way hash function.

It may be understood that, a structure of the data packet carried in the updated cross-chain request in this embodiment of this application is shown in FIG. 4, and includes four parts: the cross-chain data, the channel constraint information, the transaction certificate, and the electronic signature, where the channel constraint information includes the permission information, the transaction certificate includes the public key address, and a private key used for the electronic signature matches a public key corresponding to the public key address in the transaction certificate. That is, when the transaction certificate is the account public key address, the electronic signature is the second electronic signature obtained by performing the indirect cross-chain signature on the target cross-chain protocol data packet based on the account private key.

S310. Transmit the updated cross-chain request to a cross-chain node corresponding to the second service application.

The cross-chain node corresponding to the second service application is configured to perform cross-chain signature verification on the target cross-chain protocol data packet after the updated cross-chain request is received, and perform data processing on cross-chain data in the target cross-chain protocol data packet after the cross-chain signature verification passes.

Specifically, after the updated cross-chain request is received, the cross-chain node corresponding to the first service application transmits the updated cross-chain request to the cross-chain node corresponding to the second service application through a pre-established cross-chain channel. After the updated cross-chain request is received, the cross-chain node corresponding to the second service application obtains the account public key corresponding to the cross-chain initiator based on the updated cross-chain request, performs cross-chain signature verification on the target cross-chain protocol data packet based on the account public key and the second electronic signature, and performs data processing on the cross-chain data in the target cross-chain protocol data packet carried in the updated cross-chain request after the cross-chain signature verification passes.

In some embodiments, performing data processing on the cross-chain data in the target cross-chain protocol data packet carried in the updated cross-chain request refers to performing a data download operation or a data up-to-chain operation on a service blockchain corresponding to the second service application based on the cross-chain data.

In an embodiment, the process in which the cross-chain node corresponding to the second service application performs cross-chain signature verification on the target cross-chain protocol data packet includes the following steps: obtaining the account public key corresponding to the account public key address; decrypting the second electronic signature according to the account public key, to obtain a decryption result; and performing cross-chain comparison between the decryption result and the cross-chain protocol data packet, to obtain a verification result of the target cross-chain protocol data packet.

Specifically, after the cross-chain node corresponding to the second service application receives the updated cross-chain request carrying the target cross-chain protocol data packet and the second electronic signature, the cross-chain node corresponding to the second service application obtains the account public key of the cross-chain initiator from the governance chain based on the account public key address in the target cross-chain protocol data packet; decrypts the second electronic signature according to the obtained account public key, to obtain the decryption result; and performs cross-chain comparison between the decryption result and the target cross-chain protocol data packet, to obtain the verification result of the target cross-chain protocol data packet.

In an embodiment, if the decryption result is a decrypted target cross-chain protocol data packet, cross-chain comparison is performed between the decrypted target cross-chain protocol data packet and the target cross-chain protocol data packet. When the decrypted target cross-chain protocol data packet is the same as the target cross-chain protocol data packet, it may be determined that the cross-chain signature verification of the target cross-chain protocol data packet passes. When the decrypted target cross-chain protocol data packet is different from the target cross-chain protocol data packet, it may be determined that the cross-chain signature verification of the target cross-chain protocol data packet fails.

In an embodiment, if the decryption result is a decrypted Hash value, the cross-chain node corresponding to the second service application performs an operation on the target cross-chain protocol data packet by using a preset operation function to obtain a Hash value, and performs cross-chain comparison between the decrypted Hash value and the calculated Hash value. When the decrypted Hash value is the same as the calculated Hash value, it may be determined that the cross-chain signature verification of the target cross-chain protocol data packet passes. When the decrypted Hash value is different from the calculated Hash value, it may be determined that the cross-chain signature verification of the target cross-chain protocol data packet fails.

According to the above cross-chain data transmission method, a cross-chain node corresponding to a first service application receives a cross-chain request carrying a cross-chain protocol data packet and a first electronic signature that is initiated by the first service application, where the cross-chain protocol data packet is encapsulated with cross-chain data, permission information, and a service application public key address, and the first electronic signature is obtained by performing a cross-chain signature on the cross-chain protocol data packet based on a service application private key. When cross-chain signature verification is performed on the cross-chain protocol data packet according to the first electronic signature and the verification passes, the service application public key address in the cross-chain protocol data packet is replaced with an account public key address to obtain a target cross-chain protocol data packet, where the account public key address is an address corresponding to an account public key stored on a governance chain for cross-chain management and control. Then, an indirect cross-chain signature is performed on the target cross-chain protocol data packet based on an account private key matching the account public key to obtain a second electronic signature, and an updated cross-chain request carrying the second electronic signature and the target cross-chain protocol data packet is generated. The updated cross-chain request is transmitted to a cross-chain node corresponding to a second service application. In this way, data interoperability between different service applications and blockchains, and between a blockchain and a blockchain is realized, and the security and efficiency of data interoperability between the service applications and blockchains, and between the blockchain and the blockchain are ensured through multi-signatures and cross-chain signature verification.

In an embodiment, the cross-chain node corresponding to the first service application performs cross-chain signature verification on the cross-chain protocol data packet according to the first electronic signature, and the obtained verification result includes a result of identity verification of the first service application. The performing, by the cross-chain node corresponding to the first service application, cross-chain comparison between the decryption result and the cross-chain protocol data packet, to obtain a verification result of the cross-chain protocol data packet includes the following steps: performing cross-chain decapsulation processing on the decryption result, to obtain decrypted permission information; performing cross-chain comparison between the decrypted permission information and the permission information, to obtain a permission comparison result; and determining whether the identity verification of the first service application passes according to the permission comparison result, to obtain the verification result of performing the identity verification on the first service application.

The decryption result is a decrypted cross-chain protocol data packet, and cross-chain decapsulation processing is performed on the decryption result to obtain decrypted cross-chain data, the decrypted permission information, and a decrypted service application public key address. The permission information includes the account information and the service application information, and the identity verification of the first service application may be implemented by verifying the decrypted permission information.

Specifically, the cross-chain node corresponding to the first service application performs decapsulation processing on the received cross-chain protocol data packet, to obtain the permission information in the cross-chain protocol data packet. The cross-chain node corresponding to the first service application performs cross-chain decapsulation processing on the decryption result to obtain the decrypted permission information; performs cross-chain comparison between the decrypted permission information and the permission information in the cross-chain protocol data packet, to obtain the permission comparison result. The cross-chain node corresponding to the first service application determines that the identity verification of the first service application passes when the permission comparison result is that the decrypted permission information is the same as the permission information in the cross-chain protocol data packet, and determines that the identity verification of the first service application fails when the permission comparison result is that the decrypted permission information is different from the permission information in the cross-chain protocol data packet.

In the above embodiment, a cross-chain node corresponding to a first service application performs cross-chain decapsulation processing on a decryption result, to obtain decrypted permission information, performs cross-chain comparison between the decrypted permission information and permission information, to obtain a permission comparison result. The cross-chain node corresponding to the first service application can determine whether identity verification of the first service application passes according to the permission comparison result, thereby ensuring that the identity of the first service application is legal, and improving the security of data interoperability between a service application and a blockchain, and between a blockchain and a blockchain.

In an embodiment, the cross-chain node corresponding to the first service application performs cross-chain signature verification on the cross-chain protocol data packet according to the first electronic signature. The obtained verification result further includes a verification result of completeness verification of the cross-chain data. Performing, by the cross-chain node corresponding to the first service application, cross-chain comparison between the decryption result and the cross-chain protocol data packet, to obtain a verification result of the cross-chain protocol data packet further includes the following steps: performing cross-chain decapsulation processing on the decryption result, to obtain decrypted cross-chain data; performing cross-chain comparison between the decrypted cross-chain data and cross-chain data, to obtain a completeness comparison result; and determining whether the cross-chain data is complete according to the completeness comparison result, to obtain the verification result of performing the completeness verification on the cross-chain data.

The decryption result is a decrypted cross-chain protocol data packet, and cross-chain decapsulation processing is performed on the decryption result to obtain the decrypted cross-chain data, decrypted permission information, and a decrypted service application public key address.

Specifically, the cross-chain node corresponding to the first service application performs decapsulation processing on the received cross-chain protocol data packet, to obtain the cross-chain data in the cross-chain protocol data packet; performs cross-chain decapsulation processing on the decryption result to obtain the decrypted cross-chain data; performs cross-chain comparison between the decrypted cross-chain data and the cross-chain data in the cross-chain protocol data packet, to obtain the completeness comparison result; determines that the cross-chain data is complete when the completeness comparison result is that the decrypted cross-chain data is the same as the cross-chain data in the cross-chain protocol data packet; and determines that the cross-chain data is not complete when the completeness comparison result is that the decrypted cross-chain data is different from the cross-chain data in the cross-chain protocol data packet.

In the above embodiment, a cross-chain node corresponding to a first service application performs cross-chain decapsulation processing on a decryption result, to obtain decrypted cross-chain data; performs cross-chain comparison between the decrypted cross-chain data and cross-chain data, to obtain a completeness comparison result; and determines whether the cross-chain data is complete according to the completeness comparison result, so as to ensure that the transmitted cross-chain data is complete, thereby improving the efficiency of data interoperability between a service application and a blockchain, and between a blockchain and a blockchain.

In an embodiment, the cross-chain node corresponding to the first service application performs cross-chain signature verification on the cross-chain protocol data packet according to the first electronic signature, and the obtained verification result includes a verification result of identity verification of the first service application and a verification result of completeness verification of the cross-chain data. When both the verification result of the identity verification of the first service application and the verification result of the completeness verification of the cross-chain data are that the verification passes, it is determined that the verification result of performing the cross-chain signature verification on the cross-chain protocol data packet is that the verification passes.

In the above embodiment, a cross-chain node corresponding to a first service application performs cross-chain signature verification on a cross-chain protocol data packet, which ensures that the identity of the first service application is legal and transmitted cross-chain data is complete, thereby improving the security and efficiency of data interoperability between a service application and a blockchain, and between a blockchain and a blockchain.

In an embodiment, after cross-chain signature verification is performed on the cross-chain protocol data packet according to the first electronic signature and the verification passes, the cross-chain node corresponding to the first service application may further verify a cross-chain permission of the first service application, to obtain a cross-chain permission verification result; replace, when the cross-chain permission verification result is that the verification passes, the service application public key address in the cross-chain protocol data packet with the account public key address, to obtain the target cross-chain protocol data packet; and pause the current cross-chain data transmission procedure when the cross-chain permission verification result is that the verification fails.

In an embodiment, the process in which the cross-chain node corresponding to the first service application verifies the cross-chain permission of the first service application includes: reading the permission information in the cross-chain protocol data packet; searching channel registration information matching the permission information in the governance chain; determining the cross-chain permission verification result is that the verification passes if the matched channel registration information is found; and determining the cross-chain permission verification result is that the verification fails if the matched channel registration information is not found.

The channel registration information is, when the cross-chain channel is established, account information and service application information of the cross-chain initiator and account information and service application information of a corresponding cross-chain receiver that have associated relationships and are registered on the governance chain. The permission information is the account information and the service application information carried in the cross-chain protocol data packet.

Specifically, when the channel registration information matching the account information and the service application information carried in the cross-chain protocol data packet is found in the governance chain, it is determined that the cross-chain permission verification result is that the verification passes; and when the channel registration information matching the account information and the service application information carried in the cross-chain protocol data packet is not found in the governance chain, it is determined that the cross-chain permission verification result is that the verification fails.

In the above embodiment, a cross-chain node corresponding to a first service application verifies a cross-chain permission of the first service application, to obtain a cross-chain permission verification result; and performs, when the cross-chain permission verification result is that the verification passes, the step of replacing the service application public key address in the cross-chain protocol data packet with an account public key address, thereby ensuring that the first service application is an application with the cross-chain permission, and improving the efficiency of data interoperability between a service application and a blockchain, and between a blockchain and a blockchain.

In an embodiment, after cross-chain signature verification is performed on the target cross-chain protocol data packet according to the second electronic signature and the verification passes, the cross-chain node corresponding to the second service application may further verify a cross-chain permission of the second service application, to obtain a cross-chain permission verification result; and perform, when the cross-chain permission verification result is that the verification passes, data processing on the cross-chain data in the target cross-chain protocol data packet carried in the updated cross-chain request.

In an embodiment, the process in which the cross-chain node corresponding to the second service application verifies a cross-chain permission of the second service application includes: reading the permission information in the target cross-chain protocol data packet; searching channel registration information matching the permission information in the governance chain; determining the cross-chain permission verification result is that the verification passes if the matched channel registration information is found and the permission information in the target cross-chain protocol data packet matches the account information of the cross-chain receiver to which the second service application belongs; and determining the cross-chain permission verification result is that the verification fails if the matched channel registration information is not found or the permission information in the target cross-chain protocol data packet does not match the account information of the cross-chain receiver to which the second service application belongs.

The channel registration information is, when the cross-chain channel is established, account information and service application information of the cross-chain initiator and account information and service application information of a corresponding cross-chain receiver that have associated relationships and are registered on the governance chain. The permission information is the account information and the service application information carried in the target cross-chain protocol data packet.

In the above embodiment, after cross-chain signature verification is performed on a target cross-chain protocol data packet and the verification passes, a cross-chain node corresponding to a second service application may further verify a cross-chain permission of the second service application, to obtain a cross-chain permission verification result; and perform, when the cross-chain permission verification result is that the verification passes, data processing on cross-chain data in the target cross-chain protocol data packet carried in an updated cross-chain request. In this way, it is ensured that the identity of a cross-chain initiator is legal, the cross-chain data received by the second service application is complete, and the second service application is an application with the cross-chain permission, thereby improving the security and efficiency of data interoperability between a service application and a blockchain, and between a blockchain and a blockchain.

Figure 5:
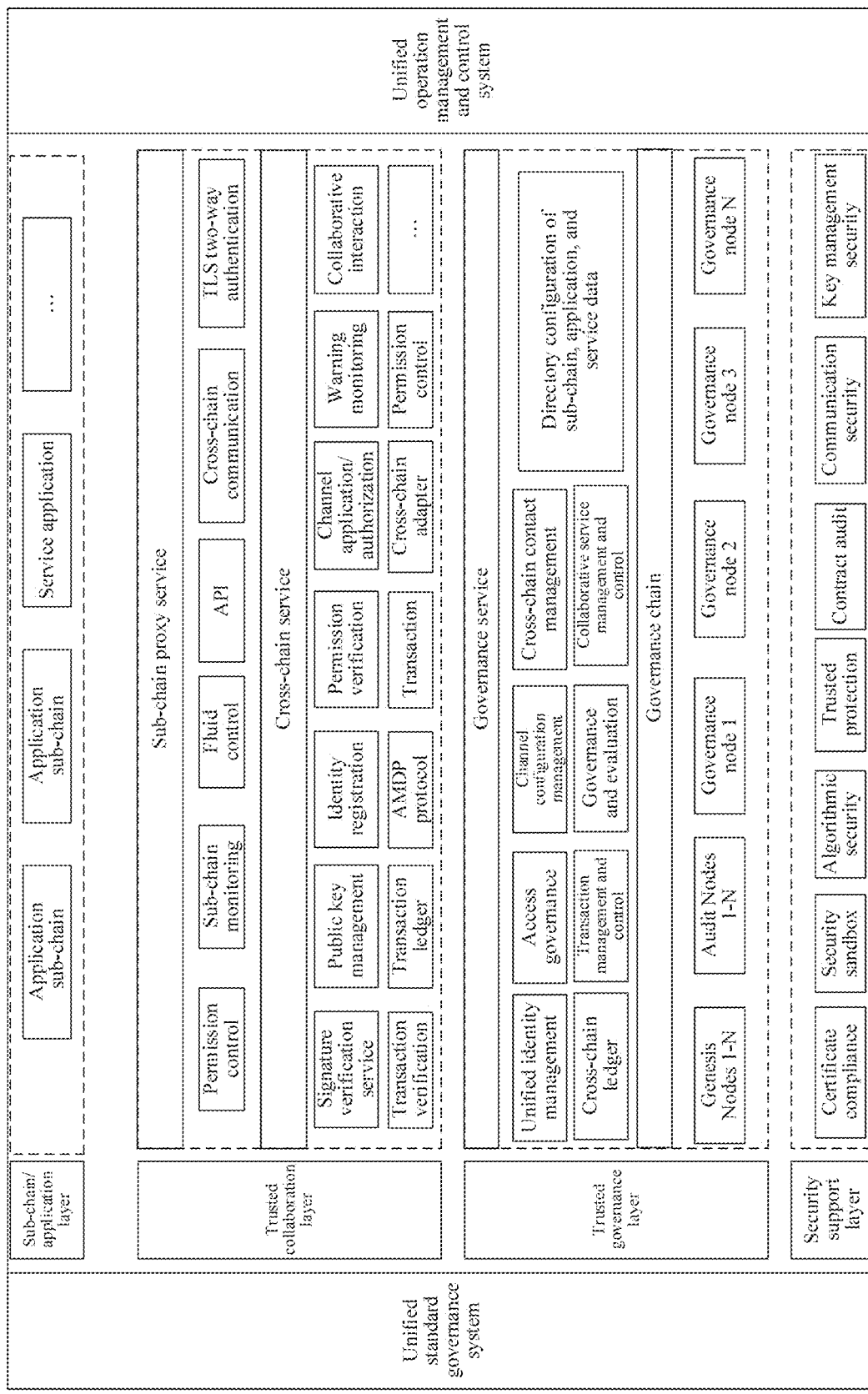
FIG. 5 is a schematic architectural diagram of a cross-chain interoperating system of blockchains according to an embodiment.

In an embodiment, the application environment shown in FIG. 2 is deployed with a blockchain cross-chain interoperability system, and FIG. 5 shows a diagram of an architecture of the blockchain cross-chain interoperability system. The architecture of the blockchain cross-chain interoperability system includes four layers and two systems, namely, a security support layer, a trusted governance layer, a trusted collaboration layer, a sub-chain application layer, a unified standard governance system, and a unified operation management and control system.

The sub-chain application layer in this architecture represents a service application and a service blockchain corresponding to an organization with a cross-chain interoperability service requirement.

A trusted collaborative service is a main service center to undertake cross-chain service processing. Functions thereof are to connect the service blockchain and a governance chain, and carry point-to-point cross-chain interconnection of the trusted collaborative service. The trusted collaboration layer includes a sub-chain proxy service and a cross-chain proxy service, where the sub-chain proxy service is responsible for data interaction with a service application, a service blockchain, and the cross-chain proxy service, and may be specifically used as a plug-in for secure data interaction with different service blockchains; and the cross-chain proxy service is a core service of cross-chain interoperability and a bridge connecting the sub-chain proxy service and the governance chain.

The trusted governance layer includes a governance service and a governance chain. The governance service mainly supports an administrator and an auditor to perform a management and control operation on the governance chain and a governance collaboration service. The governance service is divided into a service layer and a control layer. The service layer provides permission control and interface API. The control layer mainly provides governance contract management, cross-chain organization management, unified identity management, node management, collaborative service management and control, sub-chain management, application management, channel management, ledger management, data synchronization, governance synchronization monitoring, governance service management and control, and the like. The governance chain is a data support responsible for a whole-process management and control of cross-chain collaboration.

In an embodiment, the cross-chain request is received through a first sub-chain proxy service of the cross-chain node corresponding to the first service application. The cross-chain signature verification of the cross-chain protocol data packet is performed by the first sub-chain proxy service. After the cross-chain signature verification of the cross-chain protocol data packet is performed through the first sub-chain proxy service and the verification passes, the cross-chain node corresponding to the first service application forwards the received cross-chain request to a first cross-chain proxy service through the first sub-chain proxy service; reads the permission information in the cross-chain protocol data packet through the first cross-chain proxy service; searches channel registration information matching the permission information in the governance chain; and performs, when the matched channel registration information is found, the step of replacing the service application public key address in the cross-chain protocol data packet with an account public key address.

The first sub-chain proxy service is a sub-chain proxy service corresponding to the first service application of the cross-chain initiator, and the first cross-chain proxy service is a cross-chain proxy service corresponding to the first service application of the cross-chain initiator.

In an embodiment, after searching the channel registration information matching the permission information carried in the cross-chain protocol data packet in the governance chain through the first cross-chain proxy service, the cross-chain node corresponding to the first service application replaces the service application public key address in the cross-chain protocol data packet with the account public key address through the first cross-chain proxy service, to obtain the target cross-chain protocol data packet; performs the indirect cross-chain signature on the target cross-chain protocol data packet through the first cross-chain proxy service by using the account private key matching the account public key, to obtain the second electronic signature; generates the updated cross-chain request carrying the second electronic signature and the target cross-chain protocol data packet; and transmits the updated cross-chain request to the second cross-chain proxy service of the cross-chain node corresponding to the second service application through the first cross-chain proxy service. The second cross-chain proxy service is a cross-chain proxy service corresponding to the second service application of the cross-chain receiver.

In the above embodiment, a cross-chain node corresponding to a first service application performs steps of data transmission through a first sub-chain proxy service and a first cross-chain proxy service. In this way, data interoperability between different service applications and blockchains, and between a blockchain and a blockchain is realized, and the security and efficiency of data interoperability between the service applications and blockchains, and between the blockchain and the blockchain are ensured through multi-signatures and cross-chain signature verification.

In an embodiment, S310 specifically includes the following steps: obtaining a service routing address of the updated cross-chain request through the first cross-chain proxy service; and transmitting the updated cross-chain request to the cross-chain node corresponding to the second service application according to the service routing address.

The service routing address includes address information of a blockchain node corresponding to the service application of the cross-chain initiator and address information of a blockchain node corresponding to the service application of the cross-chain receiver, and the service routing address belongs to the channel constraint information.

Specifically, the cross-chain node corresponding to the first service application decapsulates the received cross-chain protocol data packet through the first cross-chain proxy service, to obtain the channel constraint information carried in the cross-chain protocol data packet; extracts the service routing address from the channel constraint information; determines the cross-chain node corresponding to the second service application based on the extracted service routing address after obtaining the updated cross-chain request; and transmits the updated cross-chain request to the second cross-chain proxy service of the cross-chain node corresponding to the second service application.

In an embodiment, the cross-chain node corresponding to the first service application receives the updated cross-chain request through the second cross-chain proxy service; performs cross-chain signature verification on the target cross-chain protocol data packet through the second cross-chain proxy service; verifies a cross-chain permission of the second service application through the second cross-chain proxy service after the cross-chain signature verification passes; forwards the cross-chain data in the target cross-chain protocol data packet carried in the updated cross-chain request to the second sub-chain proxy service when a cross-chain permission verification result is that the verification passes; and performs data processing on the cross-chain data in the target cross-chain protocol data packet carried in the updated cross-chain request through the second sub-chain proxy service.

The second cross-chain proxy service is a cross-chain proxy service corresponding to the second service application of the cross-chain receiver, and the second sub-chain proxy service is a sub-chain proxy service corresponding to the second service application of the cross-chain receiver.

In the above embodiment, a cross-chain node corresponding to a first service application obtains a service routing address of an updated cross-chain request through a first cross-chain proxy service, and transmits the updated cross-chain request to a cross-chain node corresponding to a second service application according to the service routing address, thereby realizing data interoperability between different service applications and blockchains, and between a blockchain and a blockchain.

Figure 6:
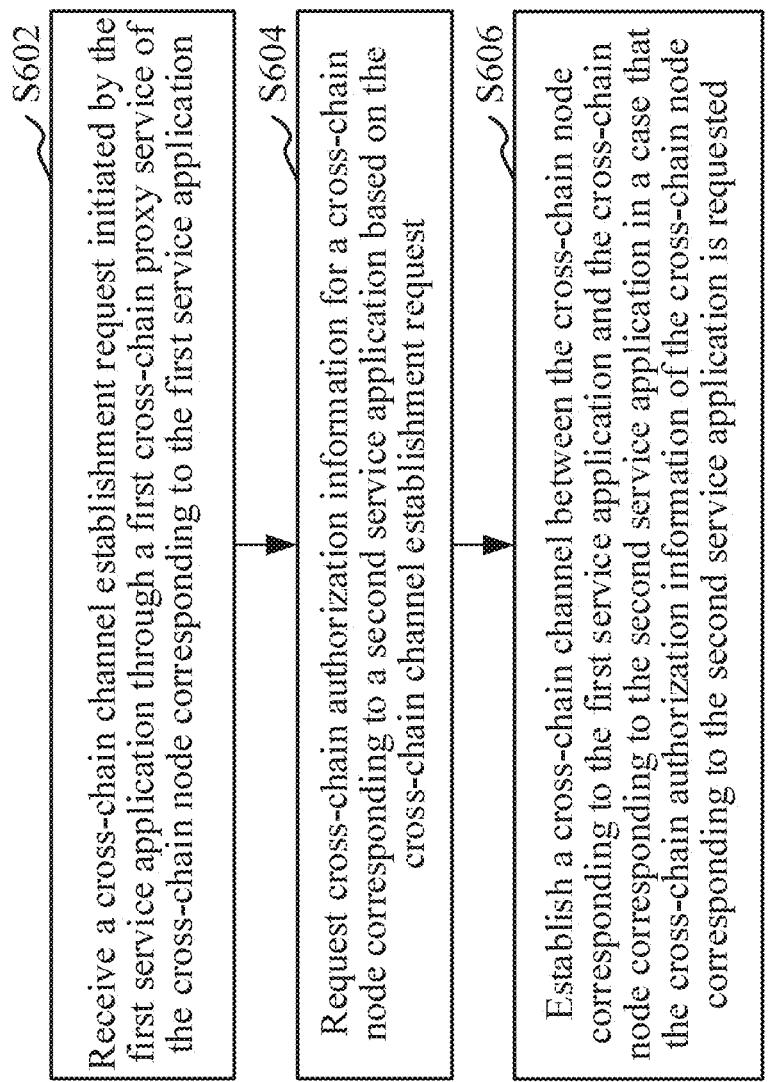
FIG. 6 is a schematic flowchart of steps of establishing a cross-chain channel according to an embodiment.

In an embodiment, before the cross-chain node corresponding to the first service application receives the cross-chain request carrying the cross-chain protocol data packet and the first electronic signature that is initiated by the first service application, the above cross-chain data transmission method further includes a process of establishing a cross-chain channel. As shown in FIG. 6, the process of establishing the cross-chain channel specifically includes the following steps.

S602. Receive a cross-chain channel establishment request initiated by the first service application through a first cross-chain proxy service of the cross-chain node corresponding to the first service application.

The cross-chain channel establishment request is used for requesting to establish a cross-chain channel between the first service application and a second service application, so as to realize cross-chain data interoperability between the first service application and the second service application based on the established cross-chain channel. The cross-chain channel establishment request carries channel registration information, where the channel registration information includes account information and service application information, the service application information includes application information and service information, the application information includes at least one of an application name, a corresponding service blockchain, a group to which an application belongs, or channel information, the service information includes at least one of service names or smart contract information corresponding to each service name, and the smart contract information includes a contract address, a contract version number, and a contract application binary interface (ABI).

Figure 7:
FIG. 7 is a schematic diagram of a registration page of a cross-chain service application according to an embodiment.

In an embodiment, before receiving the cross-chain channel establishment request initiated by the first service application, the cross-chain node corresponding to the first service application needs to pre-register service application information of the first service application on a governance chain. Referring to a registration page shown in FIG. 7, the registered service application information includes application information and service information, the application information includes an application name, a corresponding service blockchain, a group to which the application belongs, and channel information, and the service information includes service names and smart contract information corresponding to each service name, and the smart contract information includes an contract address, a contract version number, and a contract ABI.

Figure 8:
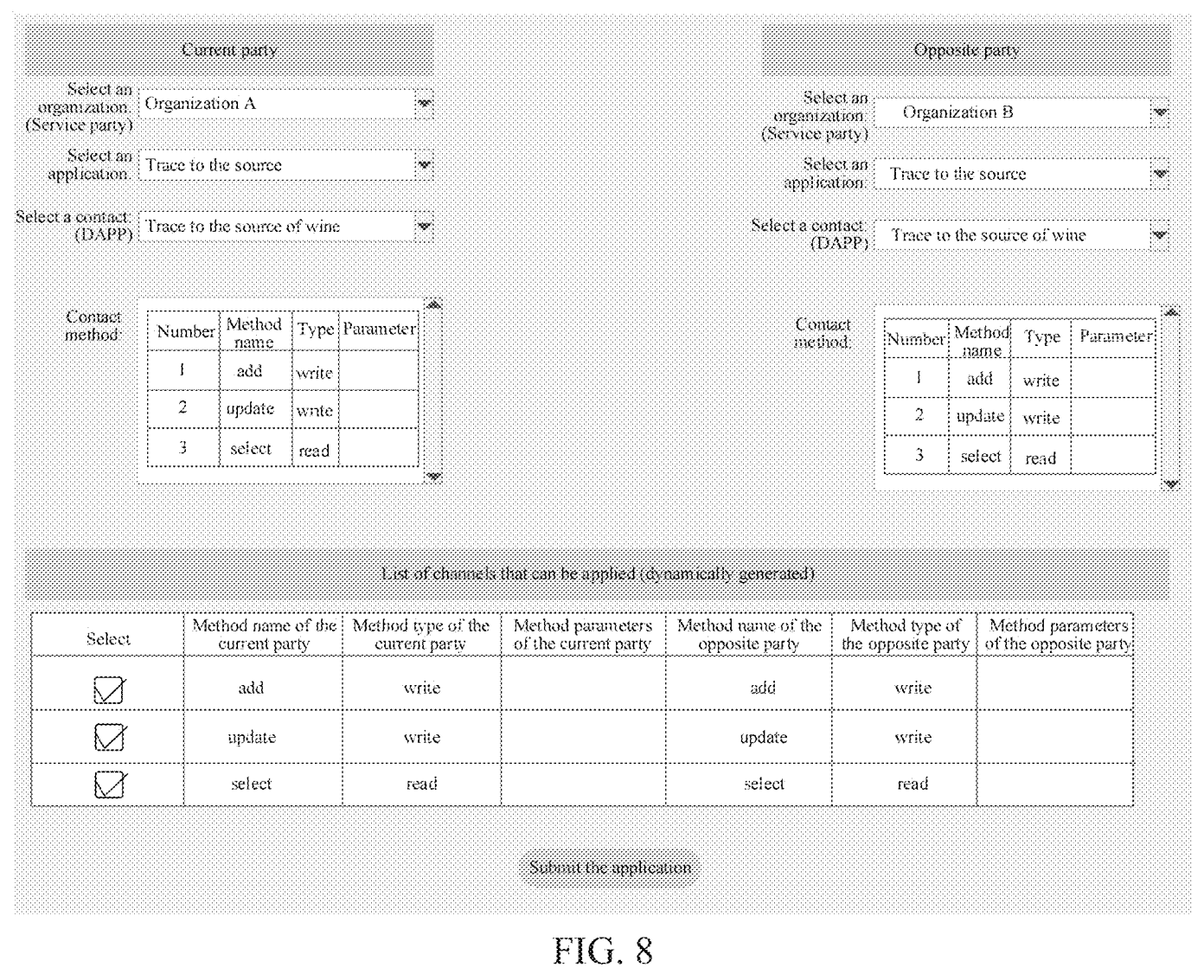

In an embodiment, after the application information of the first service application is registered on the governance chain, the first service application may initiate the cross-chain channel establishment request. The first service application needs to submit the channel registration information before initiating the cross-chain channel establishment request. Referring to a request initiation page shown in FIG. 8, the channel registration information may be submitted on the page, a current party in the figure is an initiator of the channel establishment request, namely, the first service application, and an opposite party is a receiver of the channel establishment request, such as the second service application. When an application submission button on the page is triggered, the first service application obtains the channel registration information submitted on the request initiation page, generates the cross-chain channel establishment request based on the channel registration information, and transmits the generated cross-chain channel establishment request to the cross-chain node corresponding to the first service application. The cross-chain node corresponding to the first service application receives the cross-chain channel establishment request initiated by the first service application through the first cross-chain proxy service.

S604. Request cross-chain authorization information for a cross-chain node corresponding to the second service application based on the cross-chain channel establishment request.

Specifically, after the cross-chain channel establishment request is received, the cross-chain node corresponding to the first service application registers cross-chain registration information in the cross-chain channel establishment request on the governance chain, and the governance chain may request the cross-chain authorization information for the cross-chain node corresponding to the second service application based on the registered cross-chain registration information.

Figure 9:
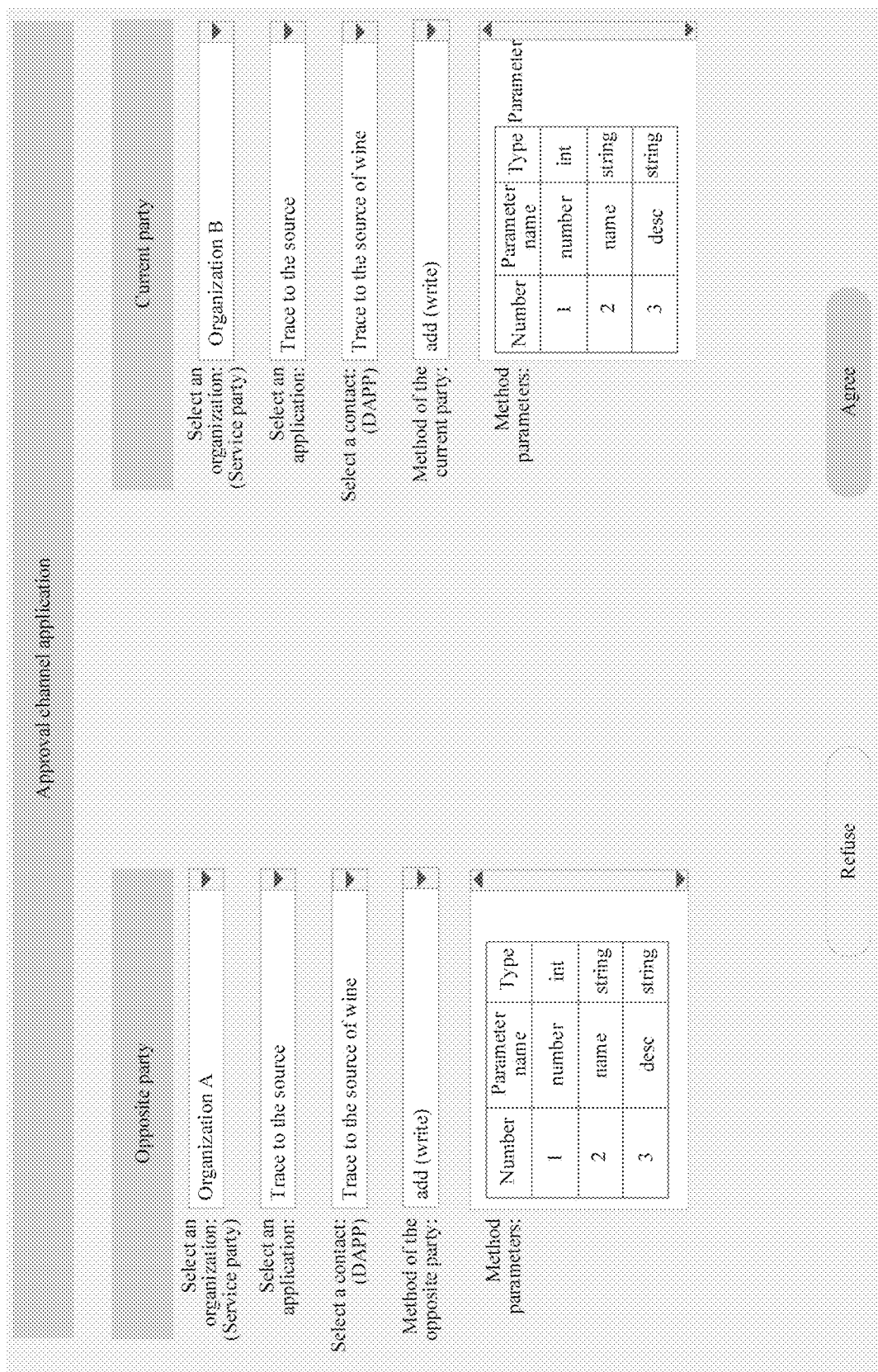
FIG. 9 is a schematic diagram of a channel establishment authorization page according to another embodiment.

Referring to a cross-chain authorization page shown in FIG. 9, after the cross-chain registration information is obtained, the cross-chain node corresponding to the second service application displays the cross-chain registration information on the cross-chain authorization page, so that a reviewer corresponding to the second service application reviews the cross-chain registration information. The reviewer can determine whether to agree to authorize based on a review result. When an authorization agreement button on the cross-chain authorization page is triggered (e.g., via selection of the "Agree" button in FIG. 9), the cross-chain node corresponding to the second service application generates the cross-chain authorization information, and returns the cross-chain authorization information to the cross-chain node corresponding to the first service application through the governance chain. When an authorization refusal button on the cross-chain authorization page is triggered (e.g., via selection of the "Refuse" button in FIG. 9), the cross-chain node corresponding to the second service application generates authorization refusal information, and returns the authorization refusal information to the cross-chain node corresponding to the first service application through the governance chain.

S606. Establish a cross-chain channel between the cross-chain node corresponding to the first service application and the cross-chain node corresponding to the second service application when the cross-chain authorization information of the cross-chain node corresponding to the second service application is requested.

Figure 10:
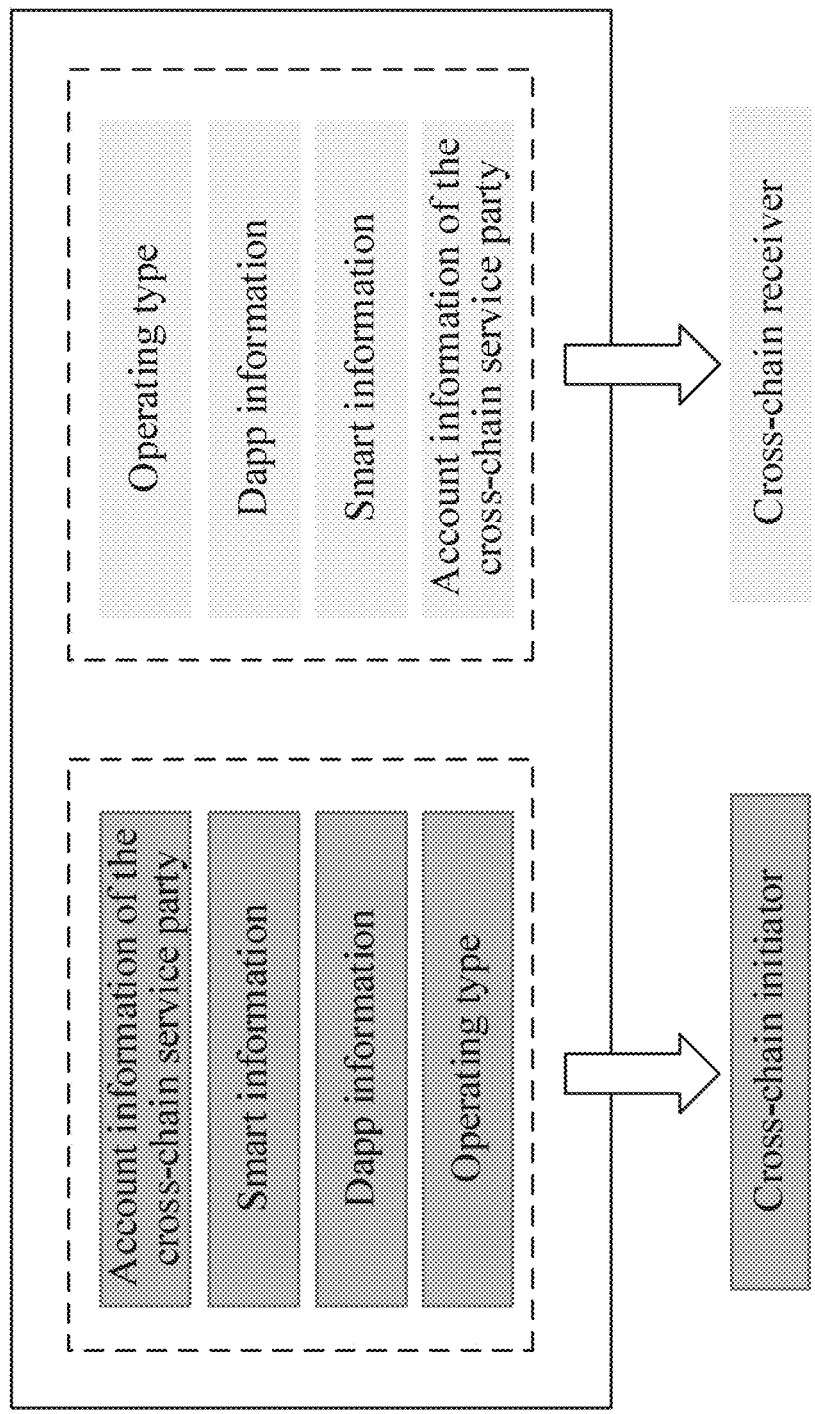
FIG. 10 is a schematic structural diagram of channel constraint information according to an embodiment.

Specifically, when the cross-chain authorization information of the cross-chain node corresponding to the second service application is requested, the cross-chain node corresponding to the first service application establishes the cross-chain channel between the cross-chain node corresponding to the first service application and the cross-chain node corresponding to the second service application based on the channel registration information registered on the governance chain. Therefore, the channel registration information registered on the governance chain may also be referred to as channel constraint information of the generated cross-chain channel. FIG. 10 is a schematic structural diagram of channel constraint information according to an embodiment.

In an embodiment, S310 specifically includes the following steps: obtaining a service routing address of the updated cross-chain request through the first cross-chain proxy service; and transmitting the updated cross-chain request to the cross-chain node corresponding to the second service application according to the service routing address and through the cross-chain channel.

In the above embodiment, a cross-chain node corresponding to a first service application receives a cross-chain channel establishment request initiated by the first service application through a first cross-chain proxy service; requests cross-chain authorization information for a cross-chain node corresponding to a second service application based on the cross-chain channel establishment request, and establishes a cross-chain channel between the cross-chain node corresponding to the first service application and the cross-chain node corresponding to the second service application when the cross-chain authorization information of the cross-chain node corresponding to the second service application is requested, so that data interoperability between different service applications and blockchains, and between a blockchain and a blockchain based on the established cross-chain channel can be subsequently realized.

In an embodiment, S604 includes the following steps: verifying the cross-chain channel establishment request according to the channel registration information carried in the cross-chain channel establishment request; determining that the verification of the cross-chain channel establishment request passes when service application information of the first service application and service application information of the second service application matching the channel registration information exist on the governance chain; and storing the channel registration information in the cross-chain channel establishment request on the governance chain, so that a second cross-chain proxy service of the cross-chain node corresponding to the second service application obtains the channel registration information from the governance chain, and determines whether to transmit cross-chain authorization information to the first cross-chain proxy service based on the channel registration information.

An objective of verifying the cross-chain channel establishment request is to determine that the second service application that requests to establish the cross-chain channel has registered on the service application information on the governance chain.

For example, after the cross-chain channel establishment request is received, the cross-chain node corresponding to the first service application extracts the channel registration information from the cross-chain channel establishment request, searches the service application information of the second service application that is the same as the channel registration information on the governance chain; and determines that the verification of the cross-chain channel establishment request passes when the service application information of the first service application and the service application information of the second service application matching the channel registration information exist on the governance chain.

In the above embodiment, a cross-chain node corresponding to a first service application verifies a cross-chain channel establishment request; and stores channel registration information in the cross-chain channel establishment request on a governance chain after the verification passes, so that a second cross-chain proxy service of a cross-chain node corresponding to a second service application obtains the channel registration information from the governance chain, and determines whether to transmit cross-chain authorization information to a first cross-chain prow service based on the channel registration information. In this way, it is ensured that a cross-chain channel between the cross-chain node corresponding to the first service application and the cross-chain node corresponding to the second service application established based on the cross-chain authorization information is a legal and available cross-chain channel, so that data interoperability between different service applications and blockchains, and between a blockchain and a blockchain based on the established cross-chain channel can be subsequently realized.

Figure 11:
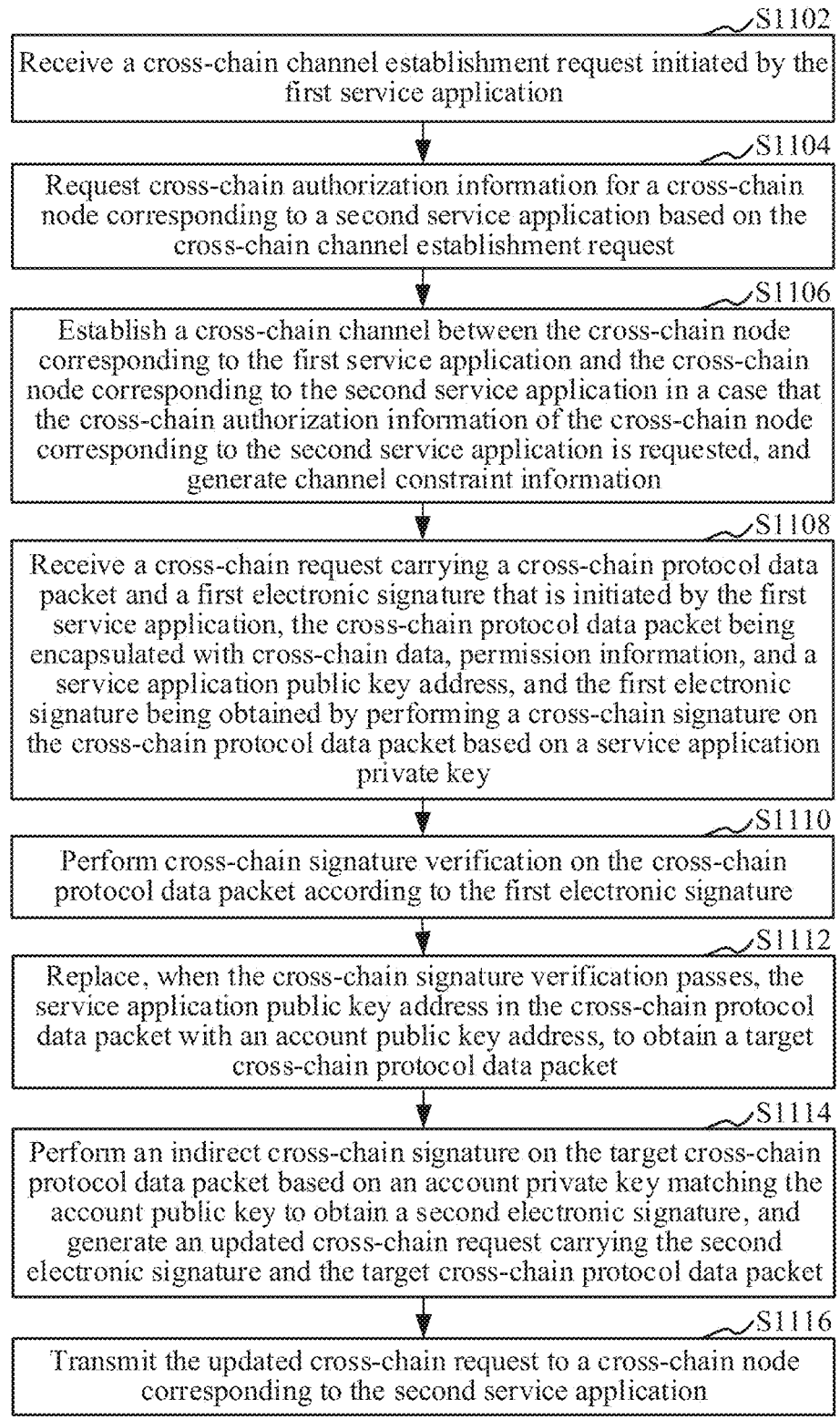
FIG. 11 is a schematic flowchart of a cross-chain data transmission method according to another embodiment.

In an embodiment, as shown in FIG. 11, a cross-chain data transmission method is provided. By using an example in which the method is applied to the cross-chain node 202a corresponding to the first service application in FIG. 2 for description, the method includes the following steps.

S1102. Receive a cross-chain channel establishment request initiated by the first service application.

S1104. Request cross-chain authorization information for a cross-chain node corresponding to a second service application based on the cross-chain channel establishment request.

S1106. Establish a cross-chain channel between the cross-chain node corresponding to the first service application and the cross-chain node corresponding to the second service application when the cross-chain authorization information of the cross-chain node corresponding to the second service application is requested, and generate channel constraint information.

S1108. Receive a cross-chain request carrying a cross-chain protocol data packet and a first electronic signature that is initiated by the first service application, the cross-chain protocol data packet being encapsulated with cross-chain data, permission information, and a service application public key address, and the first electronic signature being obtained by performing a cross-chain signature on the cross-chain protocol data packet based on a service application private key.

S1110. Perform cross-chain signature verification on the cross-chain protocol data packet according to the first electronic signature.

S1112. Replace, when the cross-chain signature verification passes, the service application public key address in the cross-chain protocol data packet with an account public key address, to obtain a target cross-chain protocol data packet.

S1114. Perform an indirect cross-chain signature on the target cross-chain protocol data packet based on an account private key matching the account public key to obtain a second electronic signature, and generate an updated cross-chain request carrying the second electronic signature and the target cross-chain protocol data packet.

S1116. Transmit the updated cross-chain request to a cross-chain node corresponding to the second service application.

Some embodiments of this application further provide an application scenario, and the above cross-chain data transmission method is applied to the application scenario. Specifically, the cross-chain data transmission method in the application scenario includes two parts, namely, a process of establishing a cross-chain channel and a process of implementing cross-chain data transmission through the cross-chain channel.

Figure 12:
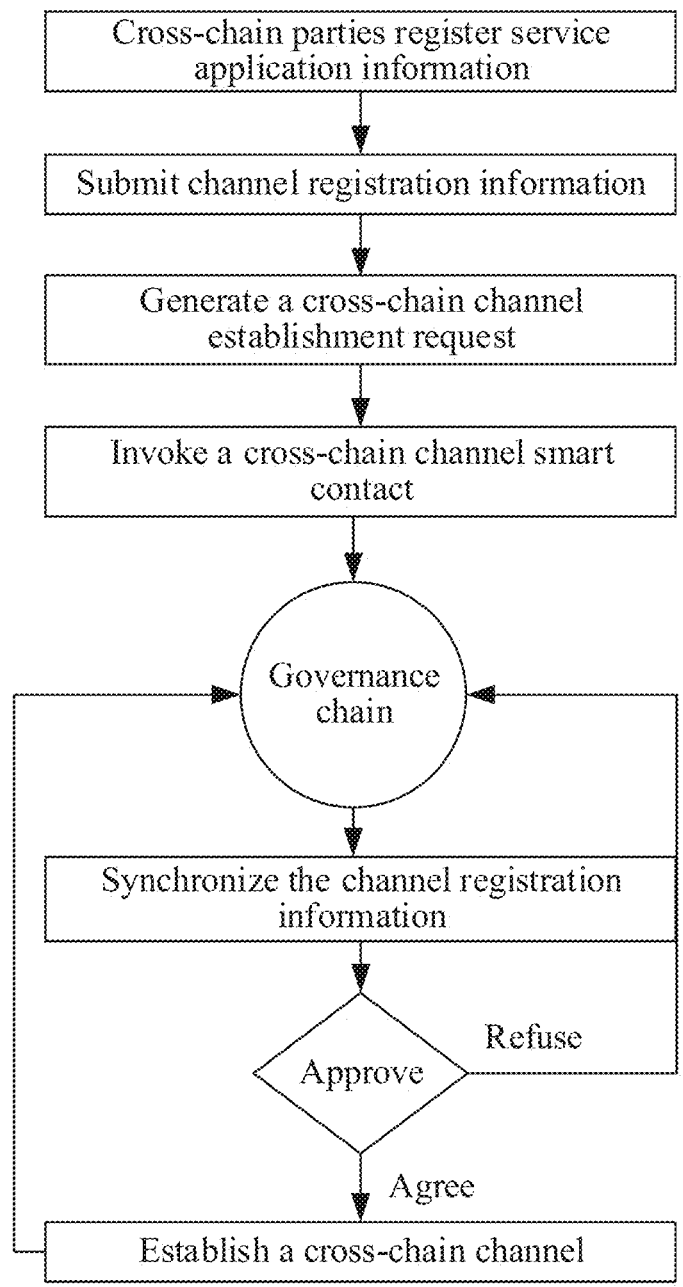
FIG. 12 is a schematic flowchart of steps of establishing a cross-chain channel according to another embodiment.

For the process of establishing the cross-chain channel: referring to a flowchart of establishing the cross-chain channel shown in FIG. 12, after each organization with a cross-chain requirement registers an account on a governance chain, each organization may register service application information of each service application thereof with the cross-chain requirement on the governance chain. Then, a cross-chain initiator submits channel registration information of selected first service application and second service application on a request initiation page, and generates a cross-chain channel establishment request based on the channel registration information. A cross-chain node corresponding to the first service application receives the cross-chain channel establishment request through a first cross-chain proxy service, substitutes a cross-chain channel smart contract based on the cross-chain channel establishment request, and submits the channel registration information to the governance chain by executing the cross-chain channel smart contract. A cross-chain receiver synchronizes the channel registration information on the governance chain; approves the channel registration information; and establishes a cross-chain channel after the approval passes, and submits a channel establishment result to the governance chain; submits an approval result to the governance chain when the approval is refused.

Figure 13:
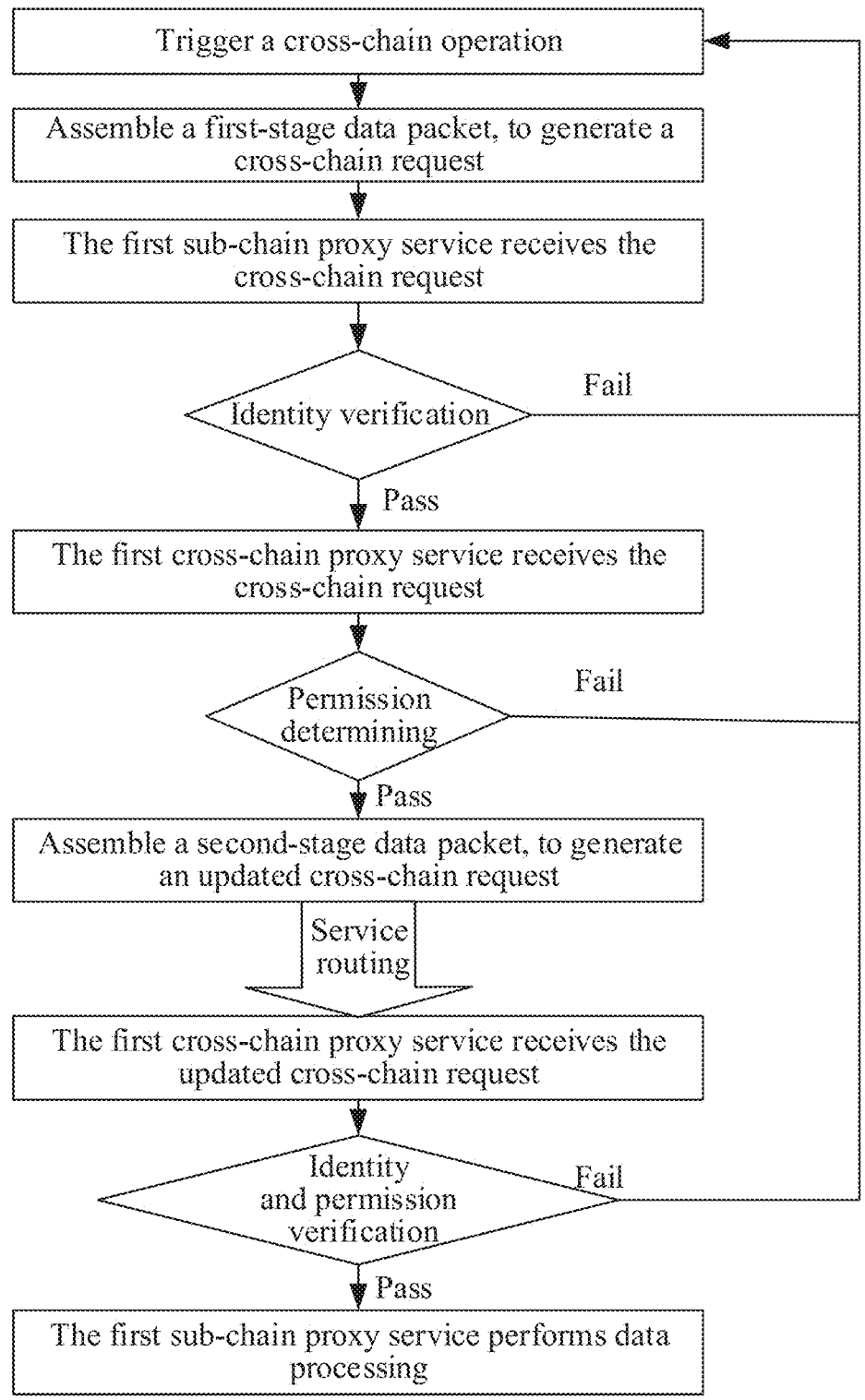
FIG. 13 is a schematic flowchart of a cross-chain data transmission method according to another embodiment.
Figure 14:
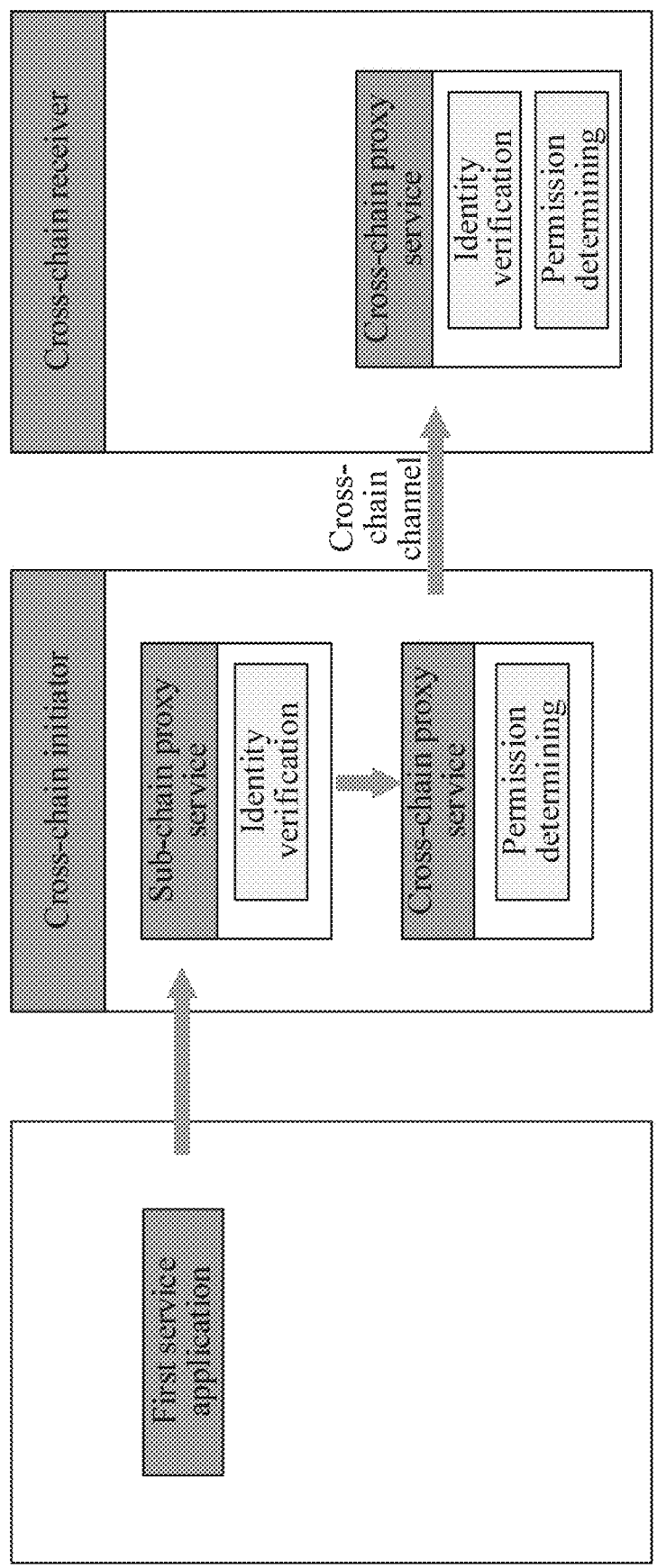
FIG. 14 is a schematic flowchart of a cross-chain data transmission method according to another embodiment.

For the process of implementing cross-chain data transmission through the cross-chain channel: referring to flowcharts of the cross-chain data transmission methods respectively shown in FIG. 13 and FIG. 14, after establishing the cross-chain channel with the second service application, the first service application (e.g., a cross-chain node corresponding to the first service application) starts to perform first-stage data packet assembly in response to a cross-chain operation triggered by a user through the first service application, to obtain a data packet including a cross-chain protocol data packet and a first electronic signature; generates a first-stage cross-chain request based on the data packet; transmits the cross-chain request to a first sub-chain proxy service; performs identity verification on the first service application through the first sub-chain proxy service; forwards the cross-chain request to a first cross-chain proxy service after the identity verification passes; determines a cross-chain permission of the first service application through the first cross-chain proxy service; reassembles the cross-chain protocol data packet after the cross-chain permission is determined, which can also be referred to as performing second-stage data packet assembly, to obtain an updated data packet including a target cross-chain protocol data packet and a second electronic signature; and generates an updated cross-chain request based on the updated data packet. The first cross-chain proxy service obtains a service routing address of the updated cross-chain request, and transmits the updated cross-chain request to a second cross-chain proxy service corresponding to the second service application according to the service routing address and through the cross-chain channel. The second cross-chain proxy service performs identity verification and cross-chain permission verification on the received updated data packet. After the identity verification and the cross-chain permission verification pass, the second sub-chain proxy service performs data processing on cross-chain data in the target cross-chain protocol data packet carried in the updated cross-chain request.

It is to be understood that, the steps in FIG. 3, FIG. 6, and FIG. 11 to FIG. 14 are sequentially displayed as indicated by arrows, but the steps are not necessarily sequentially performed in an order indicated by the arrows. Unless otherwise explicitly specified in this specification, execution of the steps is not strictly limited, and the steps may be performed in other sequences. In addition, at least some steps in FIG. 3, FIG. 6, and FIG. 11 to FIG. 14 may include a plurality of steps or a plurality of stages, and these steps or stages are not necessarily performed at a same time instant, but may be performed at different time instants. The steps or stages are not necessarily performed in sequence, but may be performed by turn or alternately with other steps or at least part of steps or stages in other steps.

Figure 15:
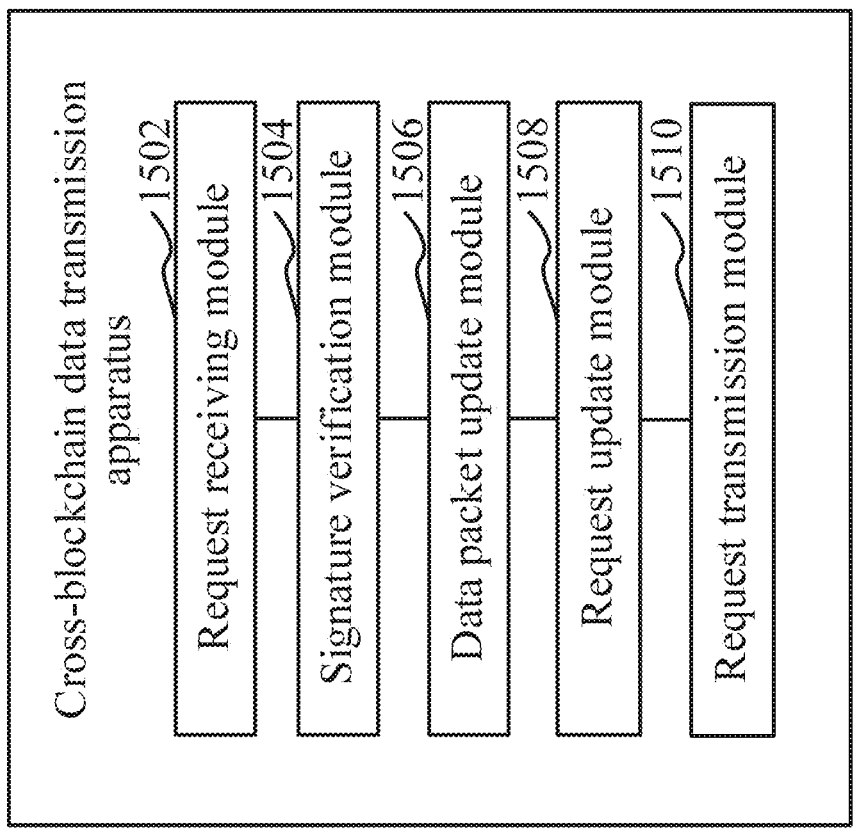
FIG. 15 is a schematic block diagram of a cross-chain data transmission apparatus according to an embodiment.

In an embodiment, as shown in FIG. 15, a cross-chain data transmission apparatus is provided. The apparatus may use software modules or hardware modules, or become a part of a computer device by a combination of the two. The apparatus specifically includes, a request receiving module 1502, a signature verification module 1504, a data packet update module 1506, a request update module 1508, and a request transmission module 1510, where the request receiving module 1502 is configured to receive a cross-chain request carrying a cross-chain protocol data packet and a first electronic signature that is initiated by a first service application, the cross-chain protocol data packet being encapsulated with cross-chain data, permission information, and a service application public key address, and the first electronic signature being obtained by performing a cross-chain signature on the cross-chain protocol data packet based on a service application private key;

the signature verification module 1504 is configured to perform cross-chain signature verification on the cross-chain protocol data packet according to the first electronic signature;

the data packet update module 1506 is configured to replace, when the cross-chain signature verification passes, the service application public key address in the cross-chain protocol data packet with an account public key address, to obtain a target cross-chain protocol data packet, the account public key address being an address corresponding to an account public key stored on a governance chain for cross-chain management and control;

the request update module 1508 is configured to perform an indirect cross-chain signature on the target cross-chain protocol data packet based on an account private key matching the account public key to obtain a second electronic signature, and generate an updated cross-chain request carrying the second electronic signature and the target cross-chain protocol data packet; and the request transmission module 1510 is configured to transmit the updated cross-chain request to a cross-chain node corresponding to a second service application.

In an embodiment, the signature verification module 1504 is further configured to: obtain a service application public key corresponding to the service application public key address, perform cross-chain decryption processing on the first electronic signature according to the service application public key, to obtain a decryption result; and perform cross-chain comparison between the decryption result and the cross-chain protocol data packet, to obtain a verification result of the cross-chain protocol data packet.

In the above embodiment, a cross-chain node corresponding to a first service application receives a cross-chain request carrying a cross-chain protocol data packet and a first electronic signature that is initiated by the first service application, where the cross-chain protocol data packet is encapsulated with cross-chain data, permission information, and a service application public key address, and the first electronic signature is obtained by performing a cross-chain signature on the cross-chain protocol data packet based on a service application private key; when cross-chain signature verification is performed on the cross-chain protocol data packet according to the first electronic signature and the verification passes, the service application public key address in the cross-chain protocol data packet is replaced with an account public key address to obtain a target cross-chain protocol data packet, where the account public key address is an address corresponding to an account public key stored on a governance chain for cross-chain management and control; then, an indirect cross-chain signature is performed on the target cross-chain protocol data packet based on an account private key matching the account public key to obtain a second electronic signature, and an updated cross-chain request carrying the second electronic signature and the target cross-chain protocol data packet is generated; and the updated cross-chain request is transmitted to a cross-chain node corresponding to a second service application. In this way, data interoperability between different service applications and blockchains, and between a blockchain and a blockchain is realized, and the security and efficiency of data interoperability between the service applications and blockchains, and between the blockchain and the blockchain are ensured through multi-signatures and cross-chain signature verification.

In an embodiment, the verification result includes a verification result of performing identity verification on the first service application; and the signature verification module 1504 is further configured to: perform cross-chain decapsulation processing on the decryption result, to obtain decrypted permission information; perform cross-chain comparison between the decrypted permission information and the permission information, to obtain a permission comparison result; and determine whether the identity verification of the first service application passes according to the permission comparison result, to obtain the verification result of performing the identity verification on the first service application.

In the above embodiment, a cross-chain node corresponding to a first service application performs cross-chain decapsulation processing on a decryption result, to obtain decrypted permission information; performs cross-chain comparison between the decrypted permission information and permission information, to obtain a permission comparison result; and can determine whether identity verification of the first service application passes according to the permission comparison result, thereby ensuring that the identity of the first service application is legal, and improving the security of data interoperability between a service application and a blockchain, and between a blockchain and a blockchain.

In an embodiment, the verification result further includes a verification result of performing completeness verification on the cross-chain data; and the signature verification module 1504 is further configured to: perform cross-chain decapsulation processing on the decryption result, to obtain decrypted cross-chain data; perform cross-chain comparison between the decrypted cross-chain data and cross-chain data, to obtain a completeness comparison result; and determine whether the cross-chain data is complete according to the completeness comparison result, to obtain the verification result of performing the completeness verification on the cross-chain data.

In the above embodiment, a cross-chain node corresponding to a first service application performs cross-chain decapsulation processing on a decryption result, to obtain decrypted cross-chain data; perform cross-chain comparison between the decrypted cross-chain data and cross-chain data, to obtain a completeness comparison result; and determine whether the cross-chain data is complete according to the completeness comparison result, so as to ensure that the transmitted cross-chain data is complete, thereby improving the efficiency of data interoperability between a service application and a blockchain, and between a blockchain and a blockchain.

Figure 16:
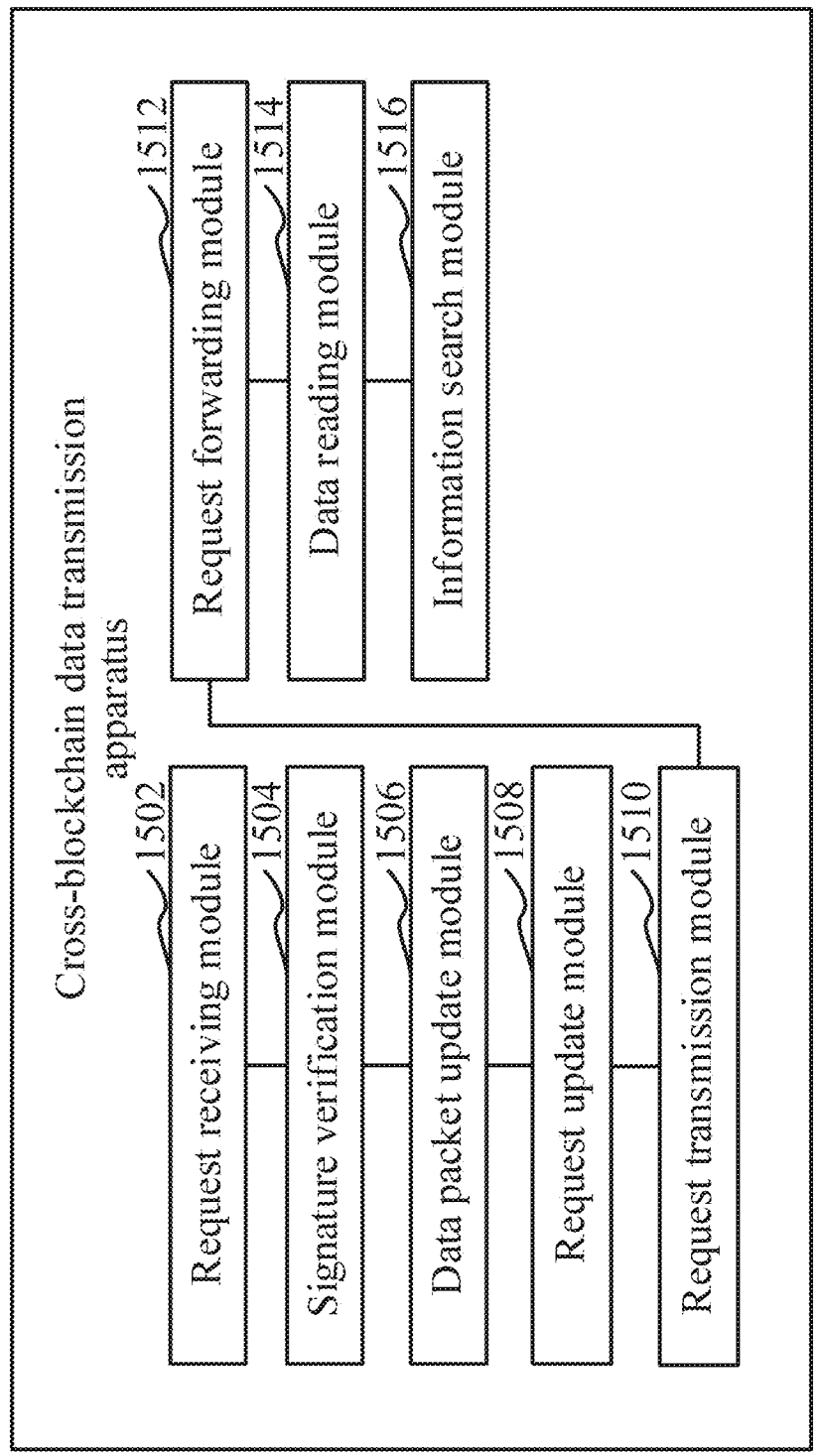
FIG. 16 is a structural block diagram of a cross-chain data transmission apparatus according to another embodiment.

In an embodiment, the cross-chain request is received through a first sub-chain proxy service of the cross-chain node corresponding to the first service application; and the completeness verification of the cross-chain data is performed by the first sub-chain proxy service. As shown in FIG. 16, the apparatus further includes: a request forwarding module 1512, a data reading module 1514, and an information search module 1516, where the request forwarding module 1512 is configured to forward, when the cross-chain data is complete data, the cross-chain request to a first cross-chain proxy service of the cross-chain node corresponding to the first service application through the first sub-chain proxy service;

the data reading module 1514 is configured to read the permission information in the cross-chain protocol data packet through the first cross-chain proxy service; and the information search module 1516 is configured to search channel registration information matching the permission information in the governance chain; and perform, through the request update module 1508 when the matched channel registration information is found, the step of replacing the service application public key address in the cross-chain protocol data packet with an account public key address.

In the above embodiment, a cross-chain node corresponding to a first service application performs steps of data transmission through a first sub-chain proxy service and a first cross-chain proxy service. In this way, data interoperability between different service applications and blockchains, and between a blockchain and a blockchain is realized, and the security and efficiency of data interoperability between the service applications and blockchains, and between the blockchain and the blockchain are ensured through multi-signatures and cross-chain signature verification.

In an embodiment, the request transmission module 1510 is further configured to: obtain a service routing address of the updated cross-chain request through the first cross-chain proxy service; and transmit the updated cross-chain request to the cross-chain node corresponding to the second service application according to the service routing address.

In the above embodiment, a cross-chain node corresponding to a first service application obtains a service routing address of an updated cross-chain request through a first cross-chain proxy service, and transmits the updated cross-chain request to a cross-chain node corresponding to a second service application according to the service routing address, thereby realizing data interoperability between different service applications and blockchains, and between a blockchain and a blockchain.

In an embodiment, the request receiving module 1502 is further configured to: receive a cross-chain channel establishment request initiated by the first service application through a first cross-chain proxy service of a cross-chain node corresponding to the first service application; the request transmission module 1510 is further configured to: request cross-chain authorization information for a cross-chain node corresponding to a second service application based on the cross-chain channel establishment request; and a cross-chain channel establishment module is further configured to establish a cross-chain channel between the cross-chain node corresponding to the first service application and the cross-chain node corresponding to the second service application when the cross-chain authorization information of the cross-chain node corresponding to the second service application is requested.

In an embodiment, the request transmission module 1510 is further configured to: obtain a service routing address of the updated cross-chain request through the first cross-chain proxy service; and transmit the updated cross-chain request to the cross-chain node corresponding to the second service application according to the service routing address and through the cross-chain channel.

In the above embodiment, a cross-chain node corresponding to a first service application receives a cross-chain channel establishment request initiated by the first service application through a first cross-chain proxy service; requests cross-chain authorization information for a cross-chain node corresponding to a second service application based on the cross-chain channel establishment request; and establishes a cross-chain channel between the cross-chain node corresponding to the first service application and the cross-chain node corresponding to the second service application when the cross-chain authorization information of the cross-chain node corresponding to the second service application is requested, so that data interoperability between different service applications and blockchains, and between a blockchain and a blockchain based on the established cross-chain channel can be subsequently realized.

In an embodiment, the request transmission module 1510 is further configured to: verify the cross-chain channel establishment request according to the channel registration information carried in the cross-chain channel establishment request; determine that the verification of the cross-chain channel establishment request passes when service application information of the first service application and service application information of the second service application matching the channel registration information exist on the governance chain; and store the channel registration information in the cross-chain channel establishment request on the governance chain, so that a second cross-chain proxy service of the cross-chain node corresponding to the second service application obtains the channel registration information from the governance chain, and determines whether to transmit cross-chain authorization information to the first cross-chain proxy service based on the channel registration information.

In an embodiment, the cross-chain node corresponding to the second service application is configured to perform cross-chain signature verification on the target cross-chain protocol data packet after the updated cross-chain request is received, and perform data processing on cross-chain data in the target cross-chain protocol data packet after the cross-chain signature verification passes.

In the above embodiment, a cross-chain node corresponding to a first service application verifies a cross-chain channel establishment request; and stores channel registration information in the cross-chain channel establishment request on a governance chain after the verification passes, so that a second cross-chain proxy service of a cross-chain node corresponding to a second service application obtains the channel registration information from the governance chain, and determines whether to transmit cross-chain authorization information to a first cross-chain proxy service based on the channel registration information. In this way, it is ensured that a cross-chain channel between the cross-chain node corresponding to the first service application and the cross-chain node corresponding to the second service application established based on the cross-chain authorization information is a legal and available cross-chain channel, so that data interoperability between different service applications and blockchains, and between a blockchain and a blockchain based on the established cross-chain channel can be subsequently realized.

For a specific limitation on the cross-chain data transmission apparatus, reference is made to the limitation on the cross-chain data transmission method above, and details are not described herein again. The modules in the above cross-chain data transmission apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, a computer device is provided. The computer device may be a server, and an internal structure diagram thereof may be shown in FIG. 17. The computer device includes one or more processors, memory, and a network interface connected through a system bus. The processor of the computer device is configured to provide computing and control capabilities. The memory of the computer device includes a non-volatile storage medium and an internal memory. The non-volatile storage medium stores an operating system, a computer program, and a database. The internal memory provides an environment for running of the operating system and the computer program in the non-volatile storage medium. The database of the computer device is configured to store service application data. The network interface of the computer device is configured to communicate with an external terminal through a network connection. The computer program is executed by the processor to implement a cross-chain data transmission method.

In an embodiment, a computer device is provided. The computer device may be a terminal, and an internal structure diagram thereof may be shown in FIG. 18. The computer device includes one or more processors, a memory, a communication interface, a display screen, and an input apparatus that are connected by using a system bus. The processor of the computer device is configured to provide computing and control capabilities. The memory of the computer device includes a non-volatile storage medium and an internal memory. The non-volatile storage medium stores an operating system and a computer program. The internal memory provides an environment for running of the operating system and the computer program in the non-volatile storage medium. The communication interface of the computer device is configured to communicate with an external terminal in a wired or wireless manner, and the wireless manner may be implemented through WIFI, a carrier network, near field communication (NFC), or other technologies. The computer program is executed by the processor to implement a cross-chain data transmission method. The display screen of the computer device may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

Figure 17:
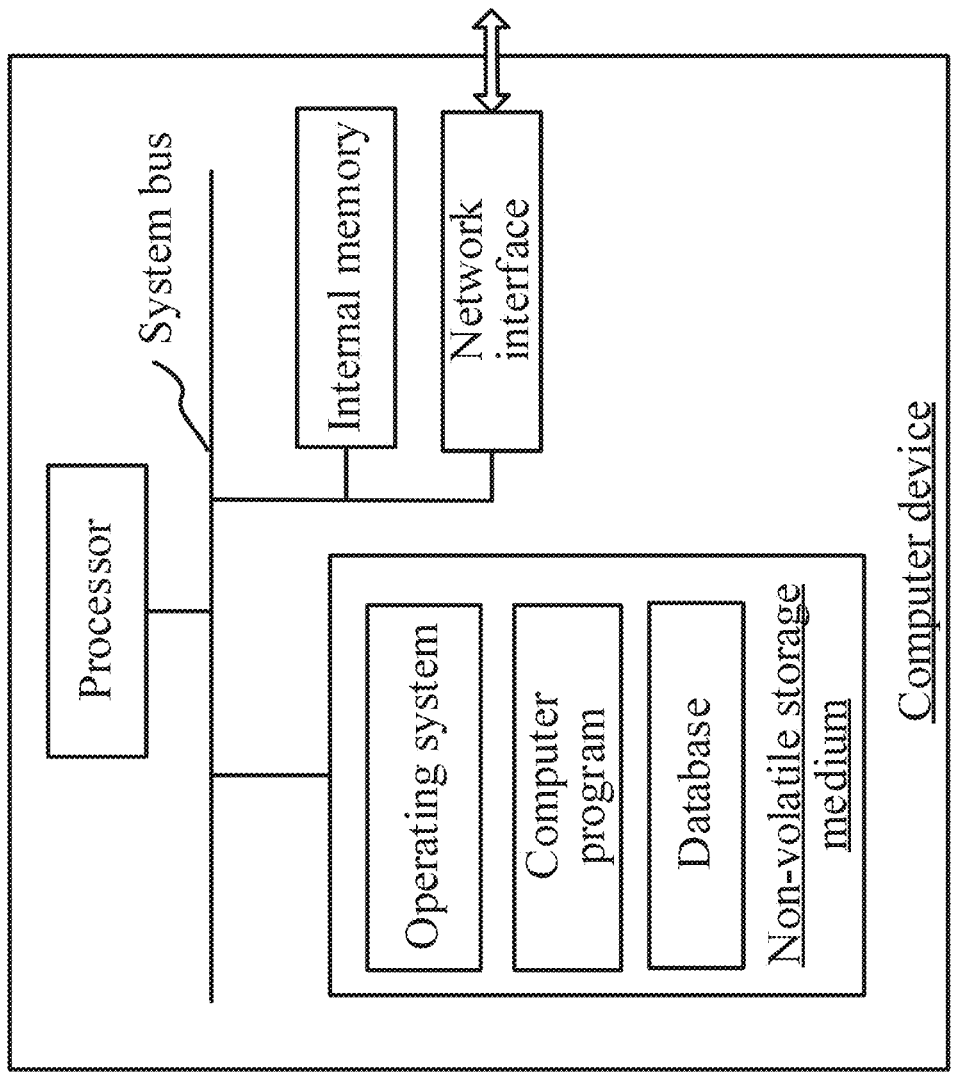
FIG. 17 is a diagram of an internal structure of a computer device according to an embodiment.
Figure 18:
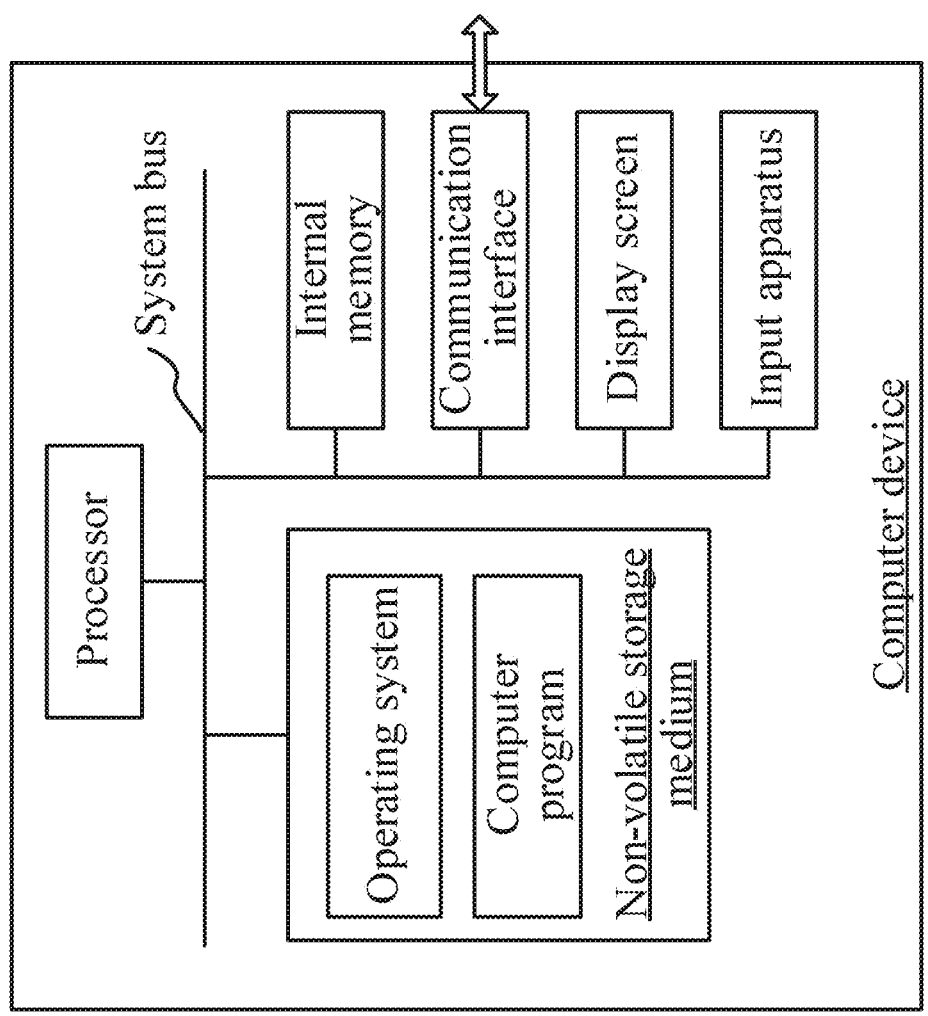
FIG. 18 is a diagram of an internal structure of a computer device according to another embodiment.

A person skilled in the art may understand that the structure shown in FIG. 17 or FIG. 18 is an exemplary block diagram of a part of a structure related to a solution of this application and does not limit the computer device to which the solution of this application is applied. Specifically, the computer device may include more or fewer components than those in the drawings, or some components are combined, or a different component deployment is used.

In an embodiment, a computer device is further provided, including a memory and a processor, where the memory stores a computer program, and the processor, when executing the computer program, implements steps in the above method embodiments.

In an embodiment, a non-transitory computer-readable storage medium is provided, storing a computer program, and the computer program, when executed by a processor, implements steps in the above method embodiments.

In an embodiment, a computer program product or a computer program is provided. The computer program product or the computer program includes computer instructions, the computer instructions being stored in a computer-readable storage medium. The processor of the computer device reads the computer instructions from the computer-readable storage medium, and the processor executes the computer instructions, to cause the computer device to perform the steps in the above method embodiments.

A person of ordinary skill in the art may understand that some or all procedures in the foregoing method embodiments may be implemented by a computer program instructing related hardware. The computer program may be stored in a non-volatile computer-readable storage medium, and when the computer program is executed, the procedures of the foregoing method embodiments may be performed. Any reference to a memory, a storage, a database, or another medium used in the embodiments provided in this application may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments only describe several implementations of this application, which are described specifically and in detail, but cannot be construed as a limitation to the patent scope of this application. For a person of ordinary skill in the art, several transformations and improvements can be made without departing from the idea of this application. These transformations and improvements belong to the protection scope of this application. Therefore, the protection scope of this application is subject to the protection scope of the appended claims.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs identity verification and/ or permissions determination. In practical application, the foregoing functions may be allocated to and completed by different functional modules according to requirements, that is, an inner structure of a device is divided into different functional modules to implement all or a part of the functions described above.

What is claimed is:

1. A cross-chain data transmission method, performed by a cross-chain node, the method comprising:
receiving a cross-chain request that is initiated by a first service application, the cross-chain request carrying a cross-chain protocol data packet and a first electronic signature, wherein:
the cross-chain protocol data packet is encapsulated with cross-chain data, permission information, and a service application public key address; and
the first electronic signature is obtained by performing a cross-chain signature on the cross-chain protocol data packet based on a service application private key;
performing cross-chain signature verification on the cross-chain protocol data packet according to the first electronic signature;
in accordance with a determination that the cross-chain signature verification is successful, replacing the service application public key address in the cross-chain protocol data packet with an account public key address, to obtain a target cross-chain protocol data packet, wherein the account public key address is an address corresponding to an account public key stored on a governance chain for cross-chain management and control;
performing an indirect cross-chain signature on the target cross-chain protocol data packet based on an account private key matching the account public key to obtain a second electronic signature;
generating an updated cross-chain request carrying the second electronic signature and the target cross-chain protocol data packet; and
transmitting the updated cross-chain request to a cross-chain node corresponding to a second service application.

2. The method according to claim 1, wherein performing the cross-chain signature verification on the cross-chain protocol data packet according to the first electronic signature comprises:
obtaining a service application public key corresponding to the service application public key address;
performing cross-chain decryption processing on the first electronic signature according to the service application public key, to obtain a decryption result; and
performing cross-chain comparison between the decryption result and the cross-chain protocol data packet, to obtain a verification result of the cross-chain protocol data packet.

3. The method according to claim 2, wherein:
the verification result comprises a verification result of performing identity verification on the first service application; and
performing the cross-chain comparison between the decryption result and the cross-chain protocol data packet, to obtain a verification result of the cross-chain protocol data packet comprises:
performing cross-chain decapsulation processing on the decryption result, to obtain decrypted permission information;
performing cross-chain comparison between the decrypted permission information and the permission information encapsulated in the cross-chain protocol data packet, to obtain a permission comparison result; and
determining whether the identity verification of the first service application passes according to the permission comparison result, to obtain the verification result of performing the identity verification on the first service application.

4. The method according to claim 3, wherein:
the verification result further comprises a verification result of performing completeness verification on the cross-chain data encapsulated in the cross-chain protocol data packet; and
the method further comprises:
performing cross-chain decapsulation processing on the decryption result, to obtain decrypted cross-chain data;
performing cross-chain comparison between the decrypted cross-chain data and the cross-chain data encapsulated in the cross-chain protocol data packet, to obtain a completeness comparison result; and
determining whether the cross-chain data is complete according to the completeness comparison result, to obtain the verification result of performing the completeness verification on the cross-chain data.

5. The method according to claim 1, further comprising before receiving the cross-chain request:
receiving a cross-chain channel establishment request initiated by the first service application through a first cross-chain proxy service of a cross-chain node corresponding to the first service application;
requesting cross-chain authorization information for the cross-chain node corresponding to the second service application based on the cross-chain channel establishment request; and
establishing a cross-chain channel between the cross-chain node corresponding to the first service application and the cross-chain node corresponding to the second service application when the cross-chain authorization information of the cross-chain node corresponding to the second service application is requested.

6. The method according to claim 5, wherein transmitting the updated cross-chain request to the cross-chain node corresponding to the second service application comprises:

obtaining a service routing address of the updated cross-chain request through the first cross-chain proxy service; and transmitting the updated cross-chain request to the cross-chain node corresponding to the second service application according to the service routing address and through the cross-chain channel.

7. The method according to claim 5, wherein requesting the cross-chain authorization information comprises:
verifying the cross-chain channel establishment request according to channel registration information carried in the cross-chain channel establishment request; and
determining that the verification of the cross-chain channel establishment request passes when service application information of the first service application and service application information of the second service application matching the channel registration information exist on the governance chain.

8. The method according to claim 7, further comprising:
storing the channel registration information in the cross-chain channel establishment request on the governance chain, so that a second cross-chain proxy service of the cross-chain node corresponding to the second service application obtains the channel registration information from the governance chain and determines whether to transmit cross-chain authorization information to the first cross-chain proxy service based on the channel registration information.

9. The method according to claim 1, wherein the cross-chain node corresponding to the second service application is configured to:
perform cross-chain signature verification on the target cross-chain protocol data packet after the updated cross-chain request is received; and
perform data processing on cross-chain data in the target cross-chain protocol data packet after the cross-chain signature verification passes.

10. A computer device corresponding to a cross-chain node, the computer device comprising:
one or more processors; and
memory storing one or more programs, the one or more programs comprising instructions that, when executed by the one or more processors, cause the one or more processors to perform operations comprising:
receiving a cross-chain request that is initiated by a first service application, the cross-chain request carrying a cross-chain protocol data packet and a first electronic signature, wherein:
the cross-chain protocol data packet is encapsulated with cross-chain data, permission information, and a service application public key address; and
the first electronic signature is obtained by performing a cross-chain signature on the cross-chain protocol data packet based on a service application private key;
performing cross-chain signature verification on the cross-chain protocol data packet according to the first electronic signature;
in accordance with a determination that the cross-chain signature verification is successful, replacing the service application public key address in the cross-chain protocol data packet with an account public key address, to obtain a target cross-chain protocol data packet, wherein the account public key address is an address corresponding to an account public key stored on a governance chain for cross-chain management and control, performing an indirect cross-chain signature on the target cross-chain protocol data packet based on an account private key matching the account public key to obtain a second electronic signature;
generating an updated cross-chain request carrying the second electronic signature and the target cross-chain protocol data packet; and
transmitting the updated cross-chain request to a cross-chain node corresponding to a second service application.

11. The computer device according to claim 10, wherein performing the cross-chain signature verification on the cross-chain protocol data packet according to the first electronic signature comprises:
obtaining a service application public key corresponding to the service application public key address;
performing cross-chain decryption processing on the first electronic signature according to the service application public key, to obtain a decryption result; and
performing cross-chain comparison between the decryption result and the cross-chain protocol data packet, to obtain a verification result of the cross-chain protocol data packet.

12. The computer device according to claim 11, wherein:
the verification result comprises a verification result of performing identity verification on the first service application; and
performing the cross-chain comparison between the decryption result and the cross-chain protocol data packet, to obtain a verification result of the cross-chain protocol data packet comprises:
performing cross-chain decapsulation processing on the decryption result, to obtain decrypted permission information;
performing cross-chain comparison between the decrypted permission information and the permission information encapsulated in the cross-chain protocol data packet, to obtain a permission comparison result; and
determining whether the identity verification of the first service application passes according to the permission comparison result, to obtain the verification result of performing the identity verification on the first service application.

13. The computer device according to claim 12, wherein:
the verification result further comprises a verification result of performing completeness verification on the cross-chain data encapsulated in the cross-chain protocol data packet; and
the operations further comprise:
performing cross-chain decapsulation processing on the decryption result, to obtain decrypted cross-chain data;
performing cross-chain comparison between the decrypted cross-chain data and the cross-chain data encapsulated in the cross-chain protocol data packet, to obtain a completeness comparison result; and
determining whether the cross-chain data is complete according to the completeness comparison result, to obtain the verification result of performing the completeness verification on the cross-chain data.

14. The computer device according to claim 10, the operations further comprising before receiving the cross-chain request:
receiving a cross-chain channel establishment request initiated by the first service application through a first cross-chain proxy service of a cross-chain node corresponding to the first service application;
requesting cross-chain authorization information for the cross-chain node corresponding to the second service application based on the cross-chain channel establishment request; and
establishing a cross-chain channel between the cross-chain node corresponding to the first service application and the cross-chain node corresponding to the second service application when the cross-chain authorization information of the cross-chain node corresponding to the second service application is requested.

15. The computer device according to claim 10, wherein the cross-chain node corresponding to the second service application is configured to:
perform cross-chain signature verification on the target cross-chain protocol data packet after the updated cross-chain request is received; and
perform data processing on cross-chain data in the target cross-chain protocol data packet after the cross-chain signature verification passes.

16. A non-transitory computer-readable storage medium, storing one or more instructions, the one or more instructions, when executed by one or more processors of a computer device corresponding to a cross-chain node, cause the computer device to perform operations comprising:
receiving a cross-chain request that is initiated by a first service application, the cross-chain request carrying a cross-chain protocol data packet and a first electronic signature, wherein:
the cross-chain protocol data packet is encapsulated with cross-chain data, permission information, and a service application public key address; and
the first electronic signature is obtained by performing a cross-chain signature on the cross-chain protocol data packet based on a service application private key;
performing cross-chain signature verification on the cross-chain protocol data packet according to the first electronic signature;
in accordance with a determination that the cross-chain signature verification is successful, replacing the service application public key address in the cross-chain protocol data packet with an account public key address, to obtain a target cross-chain protocol data packet, wherein the account public key address is an address corresponding to an account public key stored on a governance chain for cross-chain management and control;
performing an indirect cross-chain signature on the target cross-chain protocol data packet based on an account private key matching the account public key to obtain a second electronic signature;
generating an updated cross-chain request carrying the second electronic signature and the target cross-chain protocol data packet; and
transmitting the updated cross-chain request to a cross-chain node corresponding to a second service application.

17. The non-transitory computer-readable storage medium according to claim 16, wherein performing the cross-chain signature verification on the cross-chain protocol data packet according to the first electronic signature comprises:
obtaining a service application public key corresponding to the service application public key address;
performing cross-chain decryption processing on the first electronic signature according to the service application public key, to obtain a decryption result; and
performing cross-chain comparison between the decryption result and the cross-chain protocol data packet, to obtain a verification result of the cross-chain protocol data packet.

18. The non-transitory computer-readable storage medium according to claim 16, the operations further comprising before receiving the cross-chain request:
receiving a cross-chain channel establishment request initiated by the first service application through a first cross-chain proxy service of a cross-chain node corresponding to the first service application;
requesting cross-chain authorization information for the cross-chain node corresponding to the second service application based on the cross-chain channel establishment request; and
establishing a cross-chain channel between the cross-chain node corresponding to the first service application and the cross-chain node corresponding to the second service application when the cross-chain authorization information of the cross-chain node corresponding to the second service application is requested.

19. The non-transitory computer-readable storage medium according to claim 18, wherein transmitting the updated cross-chain request to the cross-chain node corresponding to the second service application comprises:
obtaining a service routing address of the updated cross-chain request through the first cross-chain proxy service; and
transmitting the updated cross-chain request to the cross-chain node corresponding to the second service application according to the service routing address and through the cross-chain channel.

20. The non-transitory computer-readable storage medium according to claim 18, wherein requesting the cross-chain authorization information comprises:
verifying the cross-chain channel establishment request according to channel registration information carried in the cross-chain channel establishment request; and
determining that the verification of the cross-chain channel establishment request passes when service application information of the first service application and service application information of the second service application matching the channel registration information exist on the governance chain.

* * * * *